(12) United States Patent
Patch

(10) Patent No.: US 8,150,699 B2
(45) Date of Patent: Apr. 3, 2012

(54) SYSTEMS AND METHODS OF A STRUCTURED GRAMMAR FOR A SPEECH RECOGNITION COMMAND SYSTEM

(75) Inventor: Kimberly Patch, Boston, MA (US)

(73) Assignee: Redstart Systems, Inc., Boston, MA (US)

( * ) Notice: Subject to any disclaimer, the term of this patent is extended or adjusted under 35 U.S.C. 154(b) by 926 days.

(21) Appl. No.: 12/123,056

(22) Filed: May 19, 2008

(65) Prior Publication Data

US 2008/0300886 A1    Dec. 4, 2008

Related U.S. Application Data

(60) Provisional application No. 60/938,599, filed on May 17, 2007.

(51) Int. Cl.
*G10L 21/00*         (2006.01)
(52) U.S. Cl. ........................................ 704/275
(58) Field of Classification Search .................. 704/275
See application file for complete search history.

(56) References Cited

U.S. PATENT DOCUMENTS

| | | |
|---|---|---|
| 5,632,002 A | 5/1997 | Hashimoto et al. |
| 5,664,061 A | 9/1997 | Andreshak et al. |
| 5,699,486 A | 12/1997 | Tullis et al. |
| 5,872,558 A | 2/1999 | Hidaka |
| 5,960,394 A | 9/1999 | Gould |
| 5,983,179 A | 11/1999 | Gould |
| 6,233,559 B1 | 5/2001 | Balakrishnan |
| 6,820,056 B1 | 11/2004 | Harif |
| 6,871,179 B1 | 3/2005 | Kist et al. |
| 6,920,425 B1 | 7/2005 | Will et al. |
| 6,963,840 B2 | 11/2005 | Sumner |
| 6,985,865 B1 * | 1/2006 | Packingham et al. .......... 704/275 |
| 7,020,609 B2 | 3/2006 | Thrift et al. |
| 7,149,694 B1 * | 12/2006 | Harb et al. ................. 704/270.1 |
| 7,313,525 B1 * | 12/2007 | Packingham et al. .......... 704/270 |
| 7,493,260 B2 * | 2/2009 | Harb et al. .................... 704/270 |
| 7,653,546 B2 * | 1/2010 | Weinmeister ................. 704/275 |
| 2006/0085748 A1 | 4/2006 | Luther et al. |

FOREIGN PATENT DOCUMENTS

| | | |
|---|---|---|
| KR | 0092683 | 8/2006 |
| WO | WO-2008/144638 A2 | 11/2008 |
| WO | WO-2008/144638 A3 | 11/2008 |

OTHER PUBLICATIONS

ISA, "International Search Report and Written Opinion", For US Patent Application No. PCT/US2008/064098, mailed on Jan. 23, 2009.

* cited by examiner

*Primary Examiner* — Susan McFadden
(74) *Attorney, Agent, or Firm* — GTC Law Group LLP & Affiliates; John A. Monocello, III; Stacey Irizarry

(57) ABSTRACT

In embodiments of the present invention, a system and method for enabling a user to interact with a computer platform using a voice command may comprise the steps of defining a structured grammar for handling a global voice command, defining a global voice command of the structured grammar wherein the global voice command enables access to an object of the computer platform using a single command, and mapping at least one function of the object to the global voice command, wherein upon receiving voice input from the user of the computer platform the object recognizes the global voice command and controls the function.

28 Claims, 11 Drawing Sheets

SYSTEMS AND METHODS OF A STRUCTURED GRAMMAR FOR A SPEECH RECOGNITION COMMAND SYSTEM

CROSS-REFERENCE TO RELATED APPLICATIONS

This application claims the benefit of the following provisional application, which is hereby incorporated by reference in its entirety:

U.S. Provisional Application Ser. No. 60/938,599, filed May 17, 2007.

BACKGROUND

1. Field

The present invention relates to a speech recognition command system, and, more particularly, to a comprehensive, global speech recognition command system to control multiple software applications.

2. Description of the Related Art

Existing speech interfaces generally use fairly small, not comprehensive sets of global commands then augment these global command sets with custom sets of commands for specific programs. These program-specific commands are fairly difficult to maintain and so they do not support a lot of programs.

Additionally, existing speech interfaces often have different ways to indicate the same thing, such as through use of synonyms. Having many different ways to say the same thing makes it difficult to remember, predict, and combine commands.

Thus, a need exists for a comprehensive, combinatorial, global speech recognition command system for a speech interface to control multiple software applications and enable control possible by keyboard, mouse, and other peripheral devices.

SUMMARY

Provided herein are systems and methods of a comprehensive, global speech recognition command system for a speech interface to control multiple software applications and enable everything possible by keyboard and mouse. In an aspect of the invention, a method for speech command control may comprise providing at least one vocabulary word, providing a set of structured grammar rules, creating at least one speech command from the at least one vocabulary word according to the structured grammar rules, and mapping an input function of a platform to the at least one speech command. In an embodiment, the input function may be at least one of a keystroke, a keyboard shortcut, a mouse action, and a combination of input functions. In an embodiment, multiple input functions may be mapped to a single speech command. In an embodiment, the method may further comprise issuing a speech command through an input device to control a platform application. In an example of this embodiment, the issued speech command may be processed by a command processor. The processed speech command may be executed by a user interface to control an associated platform application. In an example of this embodiment, the input device may be at least one of a microphone, a keyboard, a mouse, a touch pad, a roll ball, a touch-sensitive device, a gesture recognition system, a remote access device, a cellular phone, a pervasive computing device, a speech remote, a speech stick, a portable speech-enabled office, a camera, a camera with an integrated microphone, a microphone with integrated memory, and a microphone with an integrated processor. In an embodiment, the speech command may control an input function of a plurality of applications. In an embodiment, the speech command output may be presented through an output device. In an example of this embodiment, the output device may be at least one of a computer monitor, a television, a projector, an LCD screen, a touchscreen, a printer, a speech generator, a sound generator, and a speaker. In an embodiment, the platform may be at least one of an IVR, a mobile device, a handheld computer, a cellular phone, a smart phone, an embedded system, a gaming system, a kiosk, a robot, a transcription system, an automotive system, a language learning system, a home automation system, and an assistive technology for the visually impaired and/or disabled. In an embodiment, the structured grammar rules may be stored on a grammar rules server. In an example of this embodiment, the structured grammar rules server may be updated automatically. In an embodiment, commands created according to the structured grammar rules may have consistent patterns. In an embodiment, commands created according to the structured grammar rules may not have alternative wordings. In an embodiment, the structured grammar rule may be at least one of match the words used for a command as closely as possible with what the command does; use words the user sees on the screen; be consistent; balance the ease of saying a command with the ease of remembering a command; use one-word commands sparingly; eliminate unnecessary words; eliminate synonyms; reuse vocabulary words; use existing word pairs; follow the way people naturally adjust language to fit a situation; use combined commands that follow the order of events; allow the user to follow the action when necessary; use phrase modes, or words that keep mode changes within single commands, to give the computer more information; be thorough and consistent in enabling menu commands across all programs; when appropriate, allow different ways to invoke the same function; and in general, think of objects the computer can perceive and/or control, such as on-screen elements like text, symbols and graphics, virtual objects, and physical objects as logical objects, and enable similar objects to be manipulated in similar ways. In an embodiment, the speech commands may be directed to at least one of: dictating, speech menus, and speech help; working with windows; working with program elements including menus, dialog boxes, buttons, icons, and state indicators; working with the mouse arrow; working with files and folders; working at the key level; working with text; working with email; working with the Web; utilities and productivity tools; controlling where the cursor is left at the end of the command; controlling which portions of a command are repeated; controlling how many times a command or a portion of a command is repeated; controlling the relative placement of the scroll bar on a computer screen; methodically naming colors; accessing organized information using speech command modifiers; allowing the user to repeat an action at different points on a document by carrying out a speech command simultaneously with a mouse action; pasting boilerplate text into a document; editing boilerplate text on-the-fly; clearing a speech buffer; controlling the relative placement of the mouse arrow, cursor, and insertion point on a computer screen; a Time Mode; and a wait state.

In an aspect of the invention, a system for speech command control may comprise a grammar rules server for providing structured grammar rules, a vocabulary database for storing words for use in commands, a commands database for storing commands creating with vocabulary words according to structured grammar rules, a command processor for processing speech commands, an input device for providing speech commands to a command processor, a user interface for executing processed commands in an application, and an output device for presenting the output of a processed command. In an embodiment, the system may further comprise a clipboard, wherein the clipboard may be cut and pasted to by speech. In an embodiment, the system may further comprise obtaining help on speech command control from a follow-along list, user feedback capture, a grammar schematic, a dynamic command facility, a keystroke facility, a menu map facility, a speech command map facility, and a disambiguation facility. In an embodiment, the system may further comprise a speech control facility for selectively enabling and disabling speech commands for at least one of a platform operating system, a program menu, and a shortcut function. In an embodiment, the system may further comprise a menu guide for at least one of automatically speech-enabling all menu commands of a given program according to a set of logical rules, allowing users to choose which speech commands should include visual cues that show the user where the command is located in the menu system and/or dialog box, and allowing users to choose which speech commands should include visual cues to show if the command has changed a menu or dialog box element. In an embodiment, the system may further comprise a hyperlink facility for indicating any link on any type of hyperlinked page using numbers, letters and/or symbols. In an embodiment, the system may further comprise a system of modifiers to allow the user to functionalize a speech link. In an embodiment, the system may further comprise universal functions that work across all applications, wherein the function is at least one of a universal find/replace facility, a calculator, reference bookshelf tools, a text sorter, a deep clipboard and a formatting facility. In an embodiment, the command processor may coordinate multiple cursor/arrow insertion points. In an embodiment, the command processor may reconcile custom speech commands used on multiple computers. In an embodiment, the system may be portable. In an embodiment, the system may be distributed. In an embodiment, the vocabulary database may be updated by an audio annotation grammar. In an embodiment, the application may be a hidden application. In an embodiment, the application may control a slide presentation. In an embodiment, the application may be a multi-user transcription application.

In an aspect of the invention, a system and method for enabling a user to interact with a computer platform using a voice command may comprise the steps of defining a structured grammar for handling a global voice command, defining a global voice command of the structured grammar, wherein the global voice command enables access to an object of the computer platform using a single command, and mapping at least one function of the object to the global voice command, wherein upon receiving voice input from the user of the computer platform the object recognizes the global voice command and controls or executes the function. In the system and method, the structured grammar rule involves matching the words used for a command to the function, using words the user sees on a computer screen, consistency, balancing the ease of saying a command with the ease of remembering the command, using one-word commands sparingly, eliminating unnecessary words, eliminating synonyms, reusing vocabulary words, using existing word pairs, following the way people naturally adjust language to fit a situation, using combined commands that follow the order of events, allowing a user to follow the action when necessary, using words that keep mode changes within single commands, being thorough and consistent in enabling menu commands across all programs, allowing different ways to invoke the same function, and/or involves treating objects the computer can perceive and/or control as logical objects and enabling similar objects to be manipulated in similar ways. In the system and method, the structured grammar enables combinatorial voice commands. In the system and method, the function is at least one of a keystroke, a keyboard shortcut, a mouse action, and a combination of input functions. In the system and method, multiple functions are mapped to a single speech command. In the system and method, the voice command is executed by a user interface to control an associated platform application. In the system and method, the voice command is issued through an input device. The input device is at least one of a microphone, a keyboard, a mouse, a touch pad, a roll ball, a touch-sensitive device, a gesture recognition system, a remote access device, a cellular phone, a pervasive computing device, a speech remote, a speech stick, a portable speech-enabled office, a camera, a camera with an integrated microphone, a microphone with integrated memory, and a microphone with an integrated processor. In the system and method, the voice command controls an input function of a plurality of objects. In the system and method, the voice command output is presented through an output device. The output device is at least one of a computer monitor, a television, a projector, an LCD screen, a touchscreen, a printer, a speech generator, a sound generator, and a speaker. In the system and method, the computer platform is at least one of a laptop computer, a desktop computer, an IVR, a mobile device, a handheld computer, a cellular phone, a smart phone, an embedded system, a gaming system, a kiosk, a robot, a transcription system, an automotive system, a language learning system, a home automation system, and an assistive technology for persons visually impaired and/or disabled. In the system and method, the voice commands are directed to at least one of: dictating, speech menus, and speech help; working with windows; working with program elements including menus, dialog boxes, buttons, icons, and state indicators; working with a mouse arrow; working with files and folders; working at a key level; working with text; working with email; working with the Web; utilities and productivity tools; controlling where a cursor is left at the end of the command; controlling which portions of a command are repeated; controlling how many times a command or a portion of a command is repeated; controlling the relative placement of a scroll bar on a computer screen; methodically naming colors; accessing organized information using speech command modifiers; allowing the user to repeat an action at different points on a document by carrying out a speech command simultaneously with a mouse action; pasting boilerplate text into a document; editing boilerplate text on-the-fly; clearing a speech buffer; controlling the relative placement of a mouse arrow, cursor, and insertion point on a computer screen; a Time Mode; robotic control, and a wait state. In the system and method, the voice command enables independent control of at least two cursors with respect to at least one object of a computer platform. The system and method may further comprise specifying a placement of the cursor with respect to an x-y or x-y-z coordinate system associated with the object. The at least two cursors may be associated with the same object. The at least two cursors may be associated with different objects. In the system and method, the structured grammar enables a phrase mode wherein a keyword of a phrase modifies the meaning of at least one word within that phrase, and upon recognizing the keyword, an action is taken on at least one word within the phrase associated with the keyword. The keyword distinguishes between a written and symbolic form of a word. The keyword distinguishes between the full form of a word and its abbreviation. The keyword distinguishes between words that are homophones. The keyword distinguishes between different formats of the date or time. The keyword distinguishes between numbers and number values in combined commands. The object is a cursor, and the keyword distinguishes between moving the cursor then typing a number and moving the cursor a number of times. The keyword distinguishes between command words and text. The mode is automatically terminated at the end of the phrase. In the system and method, the voice command incorporates a wait state. In the system and method, the voice command is executed from a sleep state. In the system and method, the voice command executes an action for an indicated period of time.

In an aspect of the invention, a system and method for controlling a computer platform via a voice recognition system may comprise recognizing a global voice command in a computer platform, and controlling an object in accordance with the global voice command, wherein the global voice command is defined using a structured grammar that facilitates access to objects of the platform using a single voice command. In the system and method, the structured grammar rule involves matching the words used for a command to the function, using words the user sees on a computer screen, consistency, balancing the ease of saying a command with the ease of remembering the command, using one-word commands sparingly, eliminating unnecessary words, eliminating synonyms, reusing vocabulary words, using existing word pairs, following the way people naturally adjust language to fit a situation, using combined commands that follow the order of events, allowing a user to follow the action when necessary, using words that keep mode changes within single commands, being thorough and consistent in enabling menu commands across all programs, allowing different ways to invoke the same function, and/or involves treating objects the computer can perceive and/or control as logical objects and enabling similar objects to be manipulated in similar ways. In the system and method, the structured grammar enables combinatorial voice commands. In the system and method, the function is at least one of a keystroke, a keyboard shortcut, a mouse action, and a combination of input functions. In the system and method, multiple functions are mapped to a single speech command. In the system and method, the voice command is executed by a user interface to control an associated platform application. In the system and method, the voice command is issued through an input device. The input device is at least one of a microphone, a keyboard, a mouse, a touch pad, a roll ball, a touch-sensitive device, a gesture recognition system, a remote access device, a cellular phone, a pervasive computing device, a speech remote, a speech stick, a portable speech-enabled office, a camera, a camera with an integrated microphone, a microphone with integrated memory, and a microphone with an integrated processor. In the system and method, the voice command controls an input function of a plurality of objects. In the system and method, the voice command output is presented through an output device. The output device is at least one of a computer monitor, a television, a projector, an LCD screen, a touchscreen, a printer, a speech generator, a sound generator, and a speaker. In the system and method, the computer platform is at least one of a laptop computer, a desktop computer, an IVR, a mobile device, a handheld computer, a cellular phone, a smart phone, an embedded system, a gaming system, a kiosk, a robot, a transcription system, an automotive system, a language learning system, a home automation system, and an assistive technology for persons visually impaired and/or disabled. In the system and method, the voice commands are directed to at least one of: dictating, speech menus, and speech help; working with windows; working with program elements including menus, dialog boxes, buttons, icons, and state indicators; working with a mouse arrow; working with files and folders; working at a key level; working with text; working with email; working with the Web; utilities and productivity tools; controlling where a cursor is left at the end of the command; controlling which portions of a command are repeated; controlling how many times a command or a portion of a command is repeated; controlling the relative placement of a scroll bar on a computer screen; methodically naming colors; accessing organized information using speech command modifiers; allowing the user to repeat an action at different points on a document by carrying out a speech command simultaneously with a mouse action; pasting boilerplate text into a document; editing boilerplate text on-the-fly; clearing a speech buffer; controlling the relative placement of a mouse arrow, cursor, and insertion point on a computer screen; a Time Mode; robotic control, and a wait state. In the system and method, the voice command enables independent control of at least two cursors with respect to at least one object of a computer platform. The system and method may further comprise specifying a placement of the cursor with respect to an x-y or x-y-z coordinate system associated with the object. The at least two cursors may be associated with the same object. The at least two cursors may be associated with different objects. In the system and method, the structured grammar enables a phrase mode wherein a keyword of a phrase modifies the meaning of at least one word within that phrase, and upon recognizing the keyword, an action is taken on at least one word within the phrase associated with the keyword. The keyword distinguishes between a written and symbolic form of a word. The keyword distinguishes between the full form of a word and its abbreviation. The keyword distinguishes between words that are homophones. The keyword distinguishes between different formats of the date or time. The keyword distinguishes between numbers and number values in combined commands. The object is a cursor, and the keyword distinguishes between moving the cursor then typing a number and moving the cursor a number of times. The keyword distinguishes between command words and text. The mode is automatically terminated at the end of the phrase. In the system and method, the voice command incorporates a wait state. In the system and method, the voice command is executed from a sleep state. In the system and method, the voice command executes an action for an indicated period of time.

In an aspect of the invention, a system and method for enabling a user to interact with a computer platform using a voice command may comprise the steps of defining a structured grammar for generating a global voice command, and defining a global voice command based on the structured grammar, wherein the structure enables control of multiple cursors via the global voice command, wherein upon receiving voice input from the user and recognizing at least one global voice command in the voice input, the platform establishes at least two cursor positions with respect to at least one object of a computer platform in response to the global voice command. The system and method may further comprise taking an action with at least one of the at least two cursors using a voice command to specify with which cursor or cursors the action should be taken. In the system and method, the structured grammar enables combinatorial voice commands. The system and method may further comprise issuing a voice command through an input device to control a computer platform application. In the system and method, the voice command controls an input function of a plurality of objects. In the system and method, the voice command output is presented through an output device. The system and method may further comprise specifying a placement of the cursor with respect to an x-y or x-y-z coordinate system associated with the object. In the system and method, at least two cursors may be associated with the same object. In the system and method, at least two cursors may be associated with different objects. In the system and method, the positions of the at least two cursors may be preset.

In an aspect of the invention, a method for enabling a user to interact with a computer platform using a voice command may comprise the steps of recognizing a global voice command in a computer platform, and controlling an object in accordance with the global voice command, wherein the global voice command is defined using a structured grammar that facilitates access to objects of the platform using a single voice global voice command, wherein the platform establishes at least two cursor positions with respect to at least one object of a computer platform in response to the global voice command. The system and method may further comprise taking an action with at least one of the at least two cursors using a voice command to specify with which cursor or cursors the action should be taken. In the system and method, the structured grammar enables combinatorial voice commands. The system and method may further comprise issuing a voice command through an input device to control a computer platform application. In the system and method, the voice command controls an input function of a plurality of objects. In the system and method, the voice command output is presented through an output device. The system and method may further comprise specifying a placement of the cursor with respect to an x-y or x-y-z coordinate system associated with the object. In the system and method, at least two cursors may be associated with the same object. In the system and method, at least two cursors may be associated with different objects. In the system and method, the positions of the at least two cursors may be preset.

In an aspect of the invention, a system and method for enabling a user to interact with a computer platform using a voice command may comprise the steps of defining a structured grammar for generating a global voice command, and defining a global voice command based on the structured grammar, wherein the voice command is adapted to initiate a phrase mode; wherein upon receiving voice input from the user the platform recognizes initiation of the phrase mode, handles the words within that phrase based on a keyword of that phrase and automatically terminates the phrase mode at the end of the phrase. In the system and method, the structured grammar enables combinatorial voice commands. The system and method may further comprise issuing a voice command through an input device to control a computer platform application. In the system and method, the voice command controls an input function of a plurality of objects. In the system and method, the voice command output is presented through an output device. In the system and method, the keyword distinguishes between a written and symbolic form of a word. In the system and method, the voice command distinguishes between the full form of a word and its abbreviation. In the system and method, the keyword distinguishes between words that are homophones. In the system and method, the keyword distinguishes between different formats of the date or time. In the system and method, the keyword distinguishes between numbers and number values in combined commands. In the system and method, the keyword distinguishes between moving a cursor down then typing a number and moving a cursor a number of times. In the system and method, the keyword distinguishes between command words and text. In the system and method, the voice command functionalizes a speech link. In the system and method, the voice command specifies a placement of a cursor with respect to an x-y or x-y-z coordinate system associated with an object of the platform.

In an aspect of the invention, a system and method for enabling a user to interact with a computer platform using a voice command may comprise the steps of recognizing a global voice command in a computer platform and controlling an object in accordance with the global voice command, wherein the global voice command is defined using a structured grammar that facilitates access to objects of the platform using a single voice global voice command, wherein the voice command is adapted to initiate a phrase mode, wherein upon receiving voice input from the user the platform recognizes initiation of the phrase mode, handles the words within that phrase based on a keyword of that phrase and automatically terminates the phrase mode at the end of the phrase. In the system and method, the structured grammar enables combinatorial voice commands. The system and method may further comprise issuing a voice command through an input device to control a computer platform application. In the system and method, the voice command controls an input function of a plurality of objects. In the system and method, the voice command output is presented through an output device. In the system and method, the keyword distinguishes between a written and symbolic form of a word. In the system and method, the voice command distinguishes between the full form of a word and its abbreviation. In the system and method, the keyword distinguishes between words that are homophones. In the system and method, the keyword distinguishes between different formats of the date or time. In the system and method, the keyword distinguishes between numbers and number values in combined commands. In the system and method, the keyword distinguishes between moving a cursor down then typing a number and moving a cursor a number of times. In the system and method, the keyword distinguishes between command words and text. In the system and method, the voice command functionalizes a speech link. In the system and method, the voice command specifies a placement of a cursor with respect to an x-y or x-y-z coordinate system associated with an object of the platform.

In an aspect of the invention, a system and method of using multiple cursors in a speech recognition system may comprise defining a structured grammar for a speech recognition system for a computer platform, the structured grammar adapted to enable a user to use a voice command to establish at least two cursor positions with respect to an object of the computer platform, and defining a voice command by which a user may select at which cursor position an action will be taken. In the system and method, the structured grammar enables a phrase mode, wherein a keyword of a phrase modifies the meaning of words within that phrase and the mode is automatically terminated at the end of the phrase. In the system and method, the structured grammar enables combinatorial voice commands. In the system and method, the voice command output is presented through an output device. The output device is at least one of a computer monitor, a television, a projector, an LCD screen, a touchscreen, a printer, a speech generator, a sound generator, and a speaker. The system and method may further comprise specifying a placement of a cursor with respect to an x-y or x-y-z coordinate system associated with the object. In the system and method, the voice command is issued through an input device. The input device is at least one of a microphone, a keyboard, a mouse, a touch pad, a roll ball, a touch-sensitive device, a gesture recognition system, a remote access device, a cellular phone, a pervasive computing device, a speech remote, a speech stick, a portable speech-enabled office, a camera, a camera with an integrated microphone, a microphone with integrated memory, and a microphone with an integrated processor. In the system and method, the computer platform is at least one of a laptop computer, a desktop computer, an IVR, a mobile device, a handheld computer, a cellular phone, a smart phone, an embedded system, a gaming system, a kiosk, a robot, a transcription system, an automotive system, a language learning system, a home automation system, and an assistive technology for persons visually impaired and/or disabled.

In an aspect of the invention, a system and method of using multiple cursors in a speech recognition system may comprise recognizing a global voice command in a computer platform, and controlling an object in accordance with the global voice command, wherein the global voice command is defined using a structured grammar that facilitates access to at least two cursor positions of the platform using a single voice global voice command, wherein the voice command indicates at which cursor position an action will be taken. In the system and method, the structured grammar enables a phrase mode, wherein a keyword of a phrase modifies the meaning of words within that phrase and the mode is automatically terminated at the end of the phrase. In the system and method, the structured grammar enables combinatorial voice commands. In the system and method, the voice command output is presented through an output device. The output device is at least one of a computer monitor, a television, a projector, an LCD screen, a touchscreen, a printer, a speech generator, a sound generator, and a speaker. The system and method may further comprise specifying a placement of a cursor with respect to an x-y or x-y-z coordinate system associated with the object. In the system and method, the voice command is issued through an input device. The input device is at least one of a microphone, a keyboard, a mouse, a touch pad, a roll ball, a touch-sensitive device, a gesture recognition system, a remote access device, a cellular phone, a pervasive computing device, a speech remote, a speech stick, a portable speech-enabled office, a camera, a camera with an integrated microphone, a microphone with integrated memory, and a microphone with an integrated processor. In the system and method, the computer platform is at least one of a laptop computer, a desktop computer, an IVR, a mobile device, a handheld computer, a cellular phone, a smart phone, an embedded system, a gaming system, a kiosk, a robot, a transcription system, an automotive system, a language learning system, a home automation system, and an assistive technology for persons visually impaired and/or disabled.

In an aspect of the invention, a system and method of using multiple cursors in a speech recognition system may comprise defining a structured grammar for a speech recognition system for a computer platform, the structured grammar adapted to enable a user to use a voice command to establish at least two cursor positions with respect to an object of the computer platform, and defining a voice command by which a user may select at which cursor position an action will be taken, wherein the structured grammar facilitates a phrase mode such that handling of words in a phrase is based on a keyword of the phrase. In the system and method, the structured grammar enables combinatorial voice commands. In the system and method, the voice command output is presented through an output device. The system and method may further comprise specifying a placement of a cursor with respect to an x-y or x-y-z coordinate system associated with the object. In the system and method, the voice command is issued through an input device. In the system and method, the keyword distinguishes between a written and symbolic form of a word. In the system and method, the keyword distinguishes between the full form of a word and its abbreviation. In the system and method, the keyword distinguishes between words that are homophones. In the system and method, the keyword distinguishes between different formats of the date or time. In the system and method, the keyword distinguishes between numbers and number values in combined commands. In the system and method, the keyword distinguishes between moving the cursor then typing a number and moving the cursor a number of times. In the system and method, the keyword distinguishes between command words and text.

In an aspect of the invention, a system and method of using multiple cursors in a speech recognition system may comprise recognizing a global voice command in a computer platform, and controlling an object in accordance with the global voice command, wherein the global voice command is defined using a structured grammar that facilitates access to at least two cursor positions of the platform using a single voice global voice command, wherein the voice command indicates at which cursor position an action will be taken, and wherein the structured grammar facilitates a phrase mode such that handling of words in a phrase is based on a keyword of the phrase. In the system and method, the structured grammar enables combinatorial voice commands. In the system and method, the voice command output is presented through an output device. The system and method may further comprise specifying a placement of a cursor with respect to an x-y or x-y-z coordinate system associated with the object. In the system and method, the voice command is issued through an input device. In the system and method, the keyword distinguishes between a written and symbolic form of a word. In the system and method, the keyword distinguishes between the full form of a word and its abbreviation. In the system and method, the keyword distinguishes between words that are homophones. In the system and method, the keyword distinguishes between different formats of the date or time. In the system and method, the keyword distinguishes between numbers and number values in combined commands. In the system and method, the keyword distinguishes between moving the cursor then typing a number and moving the cursor a number of times. In the system and method, the keyword distinguishes between command words and text.

In an aspect of the invention, a system and method of facilitating a phrase mode in a speech recognition system may comprise defining a keyword the use of which determines handling of at least one word within a spoken phrase, defining a structured grammar for a speech recognition system, wherein upon recognizing the keyword the system takes an action on the at least one word within the phrase associated with the keyword, and automatically terminating the action associated with the keyword at the end of the phrase. In the system and method, the action modifies the meaning of the at least one word. In the system and method, the action modifies the format of the at least one word. In the system and method, the keyword distinguishes between a written and symbolic form of a word. In the system and method, the keyword distinguishes between the full form of a word and its abbreviation. In the system and method, the keyword distinguishes between words that are homophones. In the system and method, the keyword distinguishes between different formats of the date or time. In the system and method, the keyword distinguishes between numbers and number values in combined commands. In the system and method, the keyword distinguishes between moving the cursor then typing a number and moving the cursor a number of times. In the system and method, the keyword distinguishes between command words and text. In the system and method, the phrase mode enables specifying a placement of a cursor with respect to an x-y or x-y-z coordinate system associated with an object controlled by the speech recognition system. In the system and method, the phrase mode enables independent control of at least two cursors with respect to at least one object of a computer platform. The at least two cursors are may be associated with the same object. The at least two cursors may be associated with different objects.

In an aspect of the invention, a system and method of facilitating a phrase mode in a speech recognition system may comprise recognizing a keyword of a spoken phrase in a computer platform, the use of which determines handling of at least one word within the spoken phrase, taking an action on the at least one word within the phrase associated with the keyword, and automatically terminating the action associated with the keyword at the end of the phrase. In the system and method, the action modifies the meaning of the at least one word. In the system and method, the action modifies the format of the at least one word. In the system and method, the keyword distinguishes between a written and symbolic form of a word. In the system and method, the keyword distinguishes between the full form of a word and its abbreviation. In the system and method, the keyword distinguishes between words that are homophones. In the system and method, the keyword distinguishes between different formats of the date or time. In the system and method, the keyword distinguishes between numbers and number values in combined commands. In the system and method, the keyword distinguishes between moving the cursor then typing a number and moving the cursor a number of times. In the system and method, the keyword distinguishes between command words and text. In the system and method, the phrase mode enables specifying a placement of a cursor with respect to an x-y or x-y-z coordinate system associated with an object controlled by the speech recognition system. In the system and method, the phrase mode enables independent control of at least two cursors with respect to at least one object of a computer platform. The at least two cursors are associated with the same object. The at least two cursors are associated with different objects.

In an aspect of the invention, a system and method for enabling a user to interact with a robotic platform using a voice command may comprise the steps of defining a structured grammar for generating a global voice command of a speech recognition system, defining a global voice command based on the structured grammar, wherein the global voice command enables building a custom list of objects, and customizing a global voice command by referencing an item from the custom list; wherein upon receiving voice input from a user, the speech recognition system recognizes the global voice command in the voice input and provides an input to control the robotic platform in accordance with the global voice command. In the system and method, the structured grammar enables combinatorial voice commands. The system and method may further comprise issuing the voice command through an input device to control the robotic platform. The input device is at least one of a microphone, a keyboard, a mouse, a touch pad, a roll ball, a touch-sensitive device, a gesture recognition system, a remote access device, a cellular phone, a pervasive computing device, a speech remote, a speech stick, a portable speech-enabled office, a camera, a camera with an integrated microphone, a microphone with integrated memory, and a microphone with an integrated processor. In the system and method, the voice command controls an input function of a plurality of objects. In the system and method, the voice command output is presented through an output device. In the system and method, the voice command specifies placement of a robot with respect to an x-y or an x-y-z coordinate system. In the system and method, the custom list may be a list of locations, items, individuals, files, folders, websites, nicknames, reminders, and/or keywords or phrases.

In an aspect of the invention, a system and method for enabling a user to interact with a robotic platform using a voice command may comprise the steps of recognizing a custom global voice command in a computer platform, and controlling a robotic platform in accordance with the custom global voice command, wherein the global voice command is defined using a structured grammar that facilitates access to the robotic platform using a single voice command, wherein the global voice command enables building a custom list of objects, and the global voice command is customized by referencing an item from the custom list. In the system and method, the structured grammar enables combinatorial voice commands. The system and method may further comprise issuing the voice command through an input device to control the robotic platform. The input device is at least one of a microphone, a keyboard, a mouse, a touch pad, a roll ball, a touch-sensitive device, a gesture recognition system, a remote access device, a cellular phone, a pervasive computing device, a speech remote, a speech stick, a portable speech-enabled office, a camera, a camera with an integrated microphone, a microphone with integrated memory, and a microphone with an integrated processor. In the system and method, the voice command controls an input function of a plurality of objects. In the system and method, the voice command output is presented through an output device. In the system and method, the voice command specifies placement of a robot with respect to an x-y or an x-y-z coordinate system. In the system and method, the custom list may be a list of locations, items, individuals, files, folders, websites, nicknames, reminders, and/or keywords or phrases.

In an aspect of the invention, a system and method for enabling a user to interact with a computer platform using a voice command may comprise the steps of defining a structured grammar for generating a global voice command, defining a global voice command of the structured grammar, wherein the global voice command enables building a custom list of objects, and defining a macroinstruction based on at least two voice commands, wherein at least one of the two voice commands references an item from the custom list, wherein upon receiving voice input from the user the platform recognizes a macroinstruction in the voice input and executes the macroinstruction. In the system and method, defining the macroinstruction comprises cutting and pasting a voice command from a list of commands. Cutting and pasting is done by voice command. The system and method may further comprise issuing the voice command through an input device to control a computer platform application. In the system and method, the voice command controls an input function of a plurality of objects. In the system and method, the voice command output is presented through an output device. In the system and method, the voice command specifies placement of a cursor with respect to an x-y or x-y-z coordinate system associated with an object. In the system and method, the voice command specifies placement of a scroll bar with respect to an x-y or x-y-z coordinate system associated with the object. In the system and method, the voice command specifies placement of a screen keyhole with respect to an x-y or x-y-z coordinate system associated with the object. In the system and method, the voice command specifies placement of a robot with respect to an x-y or x-y-z coordinate system. In the system and method, the voice command enables independent control of at least two cursors with respect to at least one object of a computer platform. In the system and method, the voice command initiates a phrase mode wherein a keyword of a phrase modifies the meaning of words within that phrase and wherein the mode is automatically terminated at the end of the phrase. In the system and method, the custom list may be a list of locations, items, individuals, files, folders, websites, nicknames, reminders, and/or keywords or phrases. In the system and method, the voice command functionalizes a speech link. In the system and method, the computer platform is at least one of a laptop computer, a desktop computer, an IVR, a mobile device, a handheld computer, a cellular phone, a smart phone, an embedded system, a gaming system, a kiosk, a robot, a transcription system, an automotive system, a language learning system, a home automation system, and an assistive technology for persons visually impaired and/or disabled.

In an aspect of the invention, a system and method for enabling a user to interact with a computer platform using a voice command may comprise the steps of recognizing a macroinstruction in a computer platform, and controlling an object in accordance with execution of the macroinstruction, wherein the macroinstruction is based on at least two voice commands, wherein the voice commands are defined using a structured grammar that facilitates building a custom list of objects using a single voice command, and wherein at least one of the two voice commands references an item from the custom list. In the system and method, defining the macroinstruction comprises cutting and pasting a voice command from a list of commands. Cutting and pasting is done by voice command. The system and method may further comprise issuing the voice command through an input device to control a computer platform application. In the system and method, the voice command controls an input function of a plurality of objects. In the system and method, the voice command output is presented through an output device. In the system and method, the voice command specifies placement of a cursor with respect to an x-y or x-y-z coordinate system associated with an object. In the system and method, the voice command specifies placement of a scroll bar with respect to an x-y or x-y-z coordinate system associated with the object. In the system and method, the voice command specifies placement of a screen keyhole with respect to an x-y or x-y-z coordinate system associated with the object. In the system and method, the voice command specifies placement of a robot with respect to an x-y or x-y-z coordinate system. In the system and method, the voice command enables independent control of at least two cursors with respect to at least one object of a computer platform. In the system and method, the voice command initiates a phrase mode wherein a keyword of a phrase modifies the meaning of words within that phrase and wherein the mode is automatically terminated at the end of the phrase. In the system and method, the custom list may be a list of locations, items, individuals, files, folders, websites, nicknames, reminders, and/or keywords or phrases. In the system and method, the voice command functionalizes a speech link. In the system and method, the computer platform is at least one of a laptop computer, a desktop computer, an IVR, a mobile device, a handheld computer, a cellular phone, a smart phone, an embedded system, a gaming system, a kiosk, a robot, a transcription system, an automotive system, a language learning system, a home automation system, and an assistive technology for persons visually impaired and/or disabled.

In an aspect of the invention, a system and method for enabling a user to interact with a computer platform using a voice command may comprise the steps of defining a structured grammar for generating a global voice command, defining a global voice command of the structured grammar, wherein the global voice command enables building a custom list of objects, and mapping at least one function of the listed object to the global voice command, wherein upon receiving voice input from the user the platform recognizes at least one global voice command in the voice input and executes the function on the listed object in accordance with the recognized global voice command. In the system and method, the structured grammar enables combinatorial voice commands. In the system and method, the voice command specifies placement of a cursor with respect to an x-y or x-y-z coordinate system associated with the object. In the system and method, the voice command specifies placement of a scroll bar with respect to an x-y or x-y-z coordinate system associated with the object. In the system and method, the voice command specifies placement of a screen keyhole with respect to an x-y or x-y-z coordinate system associated with the object. In the system and method, the voice command specifies placement of a robot with respect to an x-y or x-y-z coordinate system. In the system and method, the voice command enables independent control of at least two cursors with respect to at least one object of a computer platform. In the system and method, the voice command corresponds to multiple keystrokes. In the system and method, the custom list may be a list of locations, items, individuals, files, folders, websites, nicknames, reminders, and/or keywords or phrases. In the system and method, the voice command functionalizes a speech link. In the system and method, the structured grammar enables a phrase mode wherein a keyword of a phrase modifies the meaning of words within that phrase, wherein the mode is automatically terminated at the end of the phrase. In the system and method, the keyword distinguishes between a written and symbolic form of a word. In the system and method, the keyword distinguishes between the full form of a word and its abbreviation. In the system and method, the keyword distinguishes between words that are homophones. In the system and method, the keyword distinguishes between different formats of the date or time. In the system and method, the keyword distinguishes between numbers and number values in combined commands. In the system and method, the keyword distinguishes between moving the cursor then typing a number and moving the cursor a number of times. In the system and method, the keyword distinguishes between command words and text.

In an aspect of the invention, a system and method for enabling a user to interact with a computer platform using a voice command may comprise the steps of recognizing a global voice command in a computer platform, and controlling a custom list object function in accordance with the global voice command, wherein the global voice command is defined using a structured grammar that facilitates building a custom list of objects using a single voice command. In the system and method, the structured grammar enables combinatorial voice commands. In the system and method, the voice command specifies placement of a cursor with respect to an x-y or x-y-z coordinate system associated with the object. In the system and method, the voice command specifies placement of a scroll bar with respect to an x-y or x-y-z coordinate system associated with the object. In the system and method, the voice command specifies placement of a screen keyhole with respect to an x-y or x-y-z coordinate system associated with the object. In the system and method, the voice command specifies placement of a robot with respect to an x-y or x-y-z coordinate system. In the system and method, the voice command enables independent control of at least two cursors with respect to at least one object of a computer platform. In the system and method, the voice command corresponds to multiple keystrokes. In the system and method, the custom list may be a list of locations, items, individuals, files, folders, websites, nicknames, reminders, and/or keywords or phrases. In the system and method, the voice command functionalizes a speech link. In the system and method, the structured grammar enables a phrase mode wherein a keyword of a phrase modifies the meaning of words within that phrase, wherein the mode is automatically terminated at the end of the phrase. In the system and method, the keyword distinguishes between a written and symbolic form of a word. In the system and method, the keyword distinguishes between the full form of a word and its abbreviation. In the system and method, the keyword distinguishes between words that are homophones. In the system and method, the keyword distinguishes between different formats of the date or time. In the system and method, the keyword distinguishes between numbers and number values in combined commands. In the system and method, the keyword distinguishes between moving the cursor then typing a number and moving the cursor a number of times. In the system and method, the keyword distinguishes between command words and text.

In an aspect of the invention, a system and method for enabling a user to interact with a computer platform using a voice command may comprise the steps of defining a structured grammar for generating a global voice command, and defining a global voice command of the structured grammar, wherein the global voice command specifies placement of an object with respect to an x-y or x-y-z coordinate system, wherein upon receiving voice input from the user the platform recognizes at least one global voice command in the voice input and places the object at the specified x-y or x-y-z coordinates in accordance with the recognized global voice command. In the system and method, the structured grammar enables combinatorial voice commands. In the system and method, the object may be a cursor, a scroll bar, a screen keyhole, and/or a robot. In the system and method, the voice command enables independent control of at least two cursors with respect to at least one object of a computer platform. In the system and method, the voice command corresponds to multiple keystrokes. In the system and method, the voice command functionalizes a speech link. In the system and method, the structured grammar enables a phrase mode wherein a keyword of a phrase modifies the meaning of words within that phrase, wherein the mode is automatically terminated at the end of the phrase. In the system and method, the voice command enables building a custom list of objects.

In an aspect of the invention, a system and method for enabling a user to interact with a computer platform using a voice command may comprise the steps of recognizing a global voice command in a computer platform, and controlling an object in accordance with the global voice command, wherein the global voice command is defined using a structured grammar that facilitates placement of the object with respect to an x-y or x-y-z coordinate system using a single voice command. In the system and method, the structured grammar enables combinatorial voice commands. In the system and method, the object may be a cursor, a scroll bar, a screen keyhole, and/or a robot. In the system and method, the voice command enables independent control of at least two cursors with respect to at least one object of a computer platform. In the system and method, the voice command corresponds to multiple keystrokes. In the system and method, the voice command functionalizes a speech link. In the system and method, the structured grammar enables a phrase mode wherein a keyword of a phrase modifies the meaning of words within that phrase, wherein the mode is automatically terminated at the end of the phrase. In the system and method, the voice command enables building a custom list of objects.

In an aspect of the invention, a system and method of using multiple cursors in a speech recognition system may comprise defining a structured grammar for a speech recognition system for a computer platform, the structured grammar adapted to enable a user to use a voice command to establish at least two cursor positions with respect to an object of the computer platform, the object being drawn from a custom list of objects, and defining a voice command by which a user may select at which cursor position an action will be taken. In the system and method, the structured grammar enables a phrase mode, wherein a keyword of a phrase modifies the meaning of words within that phrase and the mode is automatically terminated at the end of the phrase. In the system and method, the structured grammar enables combinatorial voice commands. In the system and method, the voice command output is presented through an output device. The output device is at least one of a computer monitor, a television, a projector, an LCD screen, a touchscreen, a printer, a speech generator, a sound generator, and a speaker. The system and method may further comprise specifying a placement of a cursor with respect to an x-y or x-y-z coordinate system associated with the object. In the system and method, the voice command is issued through an input device. In the system and method, the custom list may be a list of locations, items, individuals, files, folders, websites, nicknames, reminders, and/or keywords or phrases.

In an aspect of the invention, a system and method of using multiple cursors in a speech recognition system may comprise recognizing a global voice command in a speech recognition system of a computer platform, controlling an object in accordance with the voice command, wherein the voice command is defined using a structured grammar that facilitates establishment of at least two cursor positions with respect to an object of the computer platform, the object being drawn from a custom list of objects, wherein the voice command indicates at which cursor position an action will be taken. In the system and method, the structured grammar enables a phrase mode, wherein a keyword of a phrase modifies the meaning of words within that phrase and the mode is automatically terminated at the end of the phrase. In the system and method, the structured grammar enables combinatorial voice commands. In the system and method, the voice command output is presented through an output device. The output device is at least one of a computer monitor, a television, a projector, an LCD screen, a touchscreen, a printer, a speech generator, a sound generator, and a speaker. The system and method may further comprise specifying a placement of a cursor with respect to an x-y or x-y-z coordinate system associated with the object. In the system and method, the voice command is issued through an input device. In the system and method, the custom list may be a list of locations, items, individuals, files, folders, websites, nicknames, reminders, and/or keywords or phrases.

In an aspect of the invention, a system and method of using multiple cursors in a speech recognition system may comprise defining a structured grammar for a speech recognition system for a computer platform, the structured grammar adapted to enable a user to use a voice command to establish at least two cursor positions with respect to an object of the computer platform, wherein at least one of the at least two cursor positions is indicated by an x-y or x-y-z coordinate, and defining a voice command by which a user may select at which cursor position an action will be taken. In the system and method, the structured grammar enables a phrase mode, wherein a keyword of a phrase modifies the meaning of words within that phrase and the mode is automatically terminated at the end of the phrase. In the system and method, the structured grammar enables combinatorial voice commands. In the system and method, the structured grammar enables functionalizing a speech link. In the system and method, the voice command output is presented through an output device. In the system and method, the voice command is issued through an input device. The system and method may further comprise allowing a user to create a list of objects to be used with the voice command. In the system and method, the custom list may be a list of locations, items, individuals, files, folders, websites, nicknames, reminders, and/or keywords or phrases. In the system and method, the structured grammar enables a phrase mode wherein a keyword of a phrase modifies the meaning of words within that phrase, wherein the mode is automatically terminated at the end of the phrase.

In an aspect of the invention, a system and method of using multiple cursors in a speech recognition system may comprise recognizing a global voice command in a speech recognition system of a computer platform, controlling an object in accordance with the voice command, wherein the voice command is defined using a structured grammar that facilitates establishment of at least two cursor positions with respect to an object of the computer platform, wherein at least one of the at least two cursor positions is indicated by an x-y or x-y-z coordinate, wherein the voice command indicates at which cursor position an action will be taken. In the system and method, the structured grammar enables a phrase mode, wherein a keyword of a phrase modifies the meaning of words within that phrase and the mode is automatically terminated at the end of the phrase. In the system and method, the structured grammar enables combinatorial voice commands. In the system and method, the structured grammar enables functionalizing a speech link. In the system and method, the voice command output is presented through an output device. In the system and method, the voice command is issued through an input device. The system and method may further comprise allowing a user to create a list of objects to be used with the voice command. In the system and method, the custom list may be a list of locations, items, individuals, files, folders, websites, nicknames, reminders, and/or keywords or phrases. In the system and method, the structured grammar enables a phrase mode wherein a keyword of a phrase modifies the meaning of words within that phrase, wherein the mode is automatically terminated at the end of the phrase.

In an aspect of the invention, a system and method of a phrase mode in a speech recognition system may comprise defining a keyword of a voice command that indicates modified handling of at least one word within a spoken phrase, recognizing the keyword and taking an action on the at least one word within the spoken phrase, wherein the action is associated with the modified handling of the at least one word, and automatically terminating the action associated with the modified handling of the keyword at the end of the phrase, wherein the voice command specifies placement of an object with respect to an x-y or x-y-z coordinate system. In the system and method, the keyword distinguishes between a written and symbolic form of a word. In the system and method, the keyword distinguishes between the full form of a word and its abbreviation. In the system and method, the keyword distinguishes between words that are homophones. In the system and method, the keyword distinguishes between different formats of the date or time. In the system and method, the keyword distinguishes between numbers and number values in combined commands. In the system and method, the keyword distinguishes between moving the cursor then typing a number and moving the cursor a number of times. In the system and method, the keyword distinguishes between command words and text. In the system and method, the phrase mode enables independent control of at least two cursors with respect to at least one object of a computer platform. The at least two cursors are associated with the same object. The at least two cursors are associated with different objects. In the system and method, the object is a cursor, a scroll bar, a screen keyhole, and/or a robot. In the system and method, the voice command corresponds to multiple keystrokes. The system and method may further comprise allowing a user to create a list of objects to be used with the voice command.

In an aspect of the invention, a system and method of a phrase mode in a speech recognition system may comprise recognizing a global voice command in a computer platform, wherein the voice command includes a keyword that indicates modified handling of at least one word within a spoken phrase, taking an action on the at least one word within the spoken phrase, wherein the action is associated with the modified handling of the at least one word, and automatically terminating the action associated with the modified handling of the at least one word at the end of the phrase, wherein the voice command specifies placement of an object with respect to an x-y or x-y-z coordinate system. In the system and method, the keyword distinguishes between a written and symbolic form of a word. In the system and method, the keyword distinguishes between the full form of a word and its abbreviation. In the system and method, the keyword distinguishes between words that are homophones. In the system and method, the keyword distinguishes between different formats of the date or time. In the system and method, the keyword distinguishes between numbers and number values in combined commands. In the system and method, the keyword distinguishes between moving the cursor then typing a number and moving the cursor a number of times. In the system and method, the keyword distinguishes between command words and text. In the system and method, the phrase mode enables independent control of at least two cursors with respect to at least one object of a computer platform. The at least two cursors are associated with the same object. The at least two cursors are associated with different objects. In the system and method, the object is a cursor, a scroll bar, a screen keyhole, and/or a robot. In the system and method, the voice command corresponds to multiple keystrokes. The system and method may further comprise allowing a user to create a list of objects to be used with the voice command.

In an aspect of the invention, a system and method for enabling a user to interact with a clipboard of a computer platform using a voice command may comprise the steps of defining a structured grammar for handling a global voice command, defining a global voice command of the structured grammar, wherein the global voice command enables access to at least one clipboard of the computer platform using a single voice command, and wherein upon receiving voice input from the user of the computer platform the platform recognizes the global voice command and controls the clipboard. In the system and method, more than one clipboard is accessible by the voice command and the voice command indicates which clipboard should be accessed. The clipboard is associated with an application that can access the items on the clipboard. In the system and method, control of the clipboard may comprise at least one of copying an item to the clipboard or pasting an item from the clipboard. The item may be at least one of a URL, a character or string of characters, a picture, a video file, and an audio file. In the system and method, the clipboard persists after the computer platform has been shut down. In the system and method, the voice command enables access to a historical version of the clipboard. In the system and method, the voice command is issued through an input device. In the system and method, the voice command controls an input function of a plurality of objects. In the system and method, the voice command incorporates a wait state. In the system and method, the voice command is executed from a sleep state. In the system and method, the voice command executes an action for an indicated period of time.

In an aspect of the invention, a system and method for enabling a user to interact with a computer platform using a voice command may comprise the steps of defining a structured grammar for handling a global voice command, defining a global voice command of the structured grammar, wherein the global voice command enables access to at least one object of the computer platform using a single command, and wherein the at least one object is either not currently the focus or not open; and mapping at least one function of the at least one object to the global voice command, wherein upon receiving voice input from the user of the computer platform the object recognizes the global voice command and executes the function. In the system and method, the object is a screen. In the system and method, the object is a program. In the system and method, the voice command puts the at least one object in focus. In the system and method, the voice command opens the at least one object. In the system and method, the voice command combines addressing a program and opening at least one of a file, folder and website in that program. In the system and method, the voice command combines addressing a given screen, addressing a given object, and carrying out an action on that object.

In an aspect of the invention, a system and method for enabling a user to interact with a computer platform using a voice command may comprise the steps of defining a structured grammar for handling a global voice command, defining a global voice command of the structured grammar, wherein the global voice command enables inclusion of a pause in accessing an object of the computer platform, and mapping at least one function of the object to the global voice command, wherein upon receiving voice input from the user of the computer platform the function recognizes the global voice command and controls the object. In the system and method, the pause enables accessing an object of the platform via a different input method during the pause. In the system and method, the pause enables a single voice command to be carried out over time. In the system and method, the pause enables a user to indicate a timing of slides in a presentation with a single voice command. The voice command may further indicate a sequence of slides.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

DETAILED DESCRIPTION

Throughout this disclosure the phrase "such as" means "such as and without limitation." Throughout this disclosure the phrase "for example" means "for example and without limitation." Throughout this disclosure the phrase "in an example" means "in an example and without limitation." Throughout this disclosure the phrase "in another example" means "in another example and without limitation." Generally, any and all examples may be provided for the purpose of illustration and not limitation.

Figure 1:
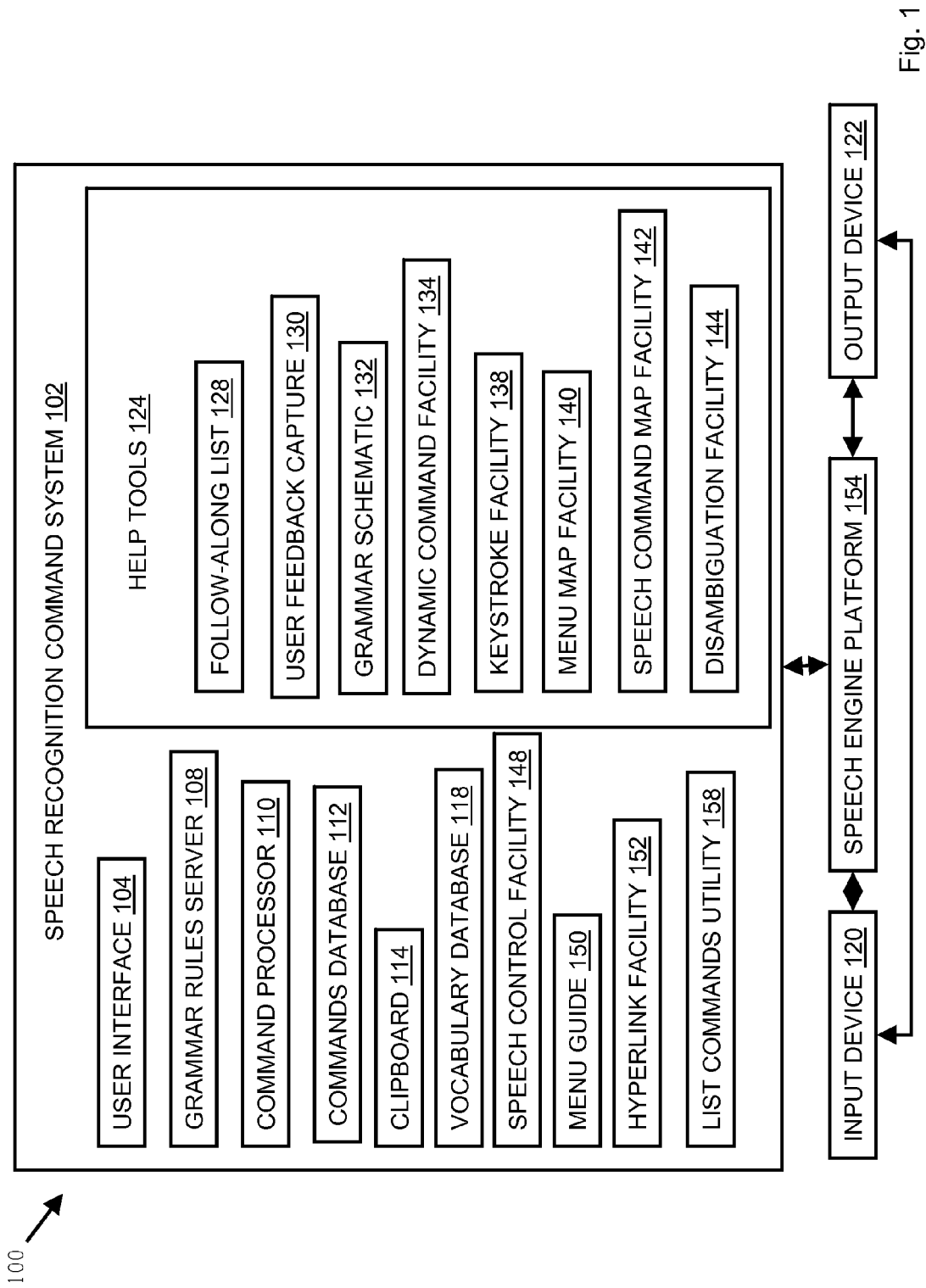
FIG. 1 depicts a speech recognition command system.

Referring to FIG. 1, a speech recognition command system 102 may comprise a user interface 104, a grammar rules server 108, a command processor 110, a commands database 112, a clipboard 114, a vocabulary database 118, a speech control facility 148, a menu guide 150, a hyperlink facility 152, a list commands utility 158, help tools 124, and the like. The speech recognition command system 102 may receive, through a speech engine platform 154, input from an input device 120 and provide output through an output device 122. The input device 120 may also provide output directly to an output device 122.

Continuing to refer to FIG. 1, the speech recognition command system 102 may comprise words and rules that map traditional input functions such as keyboard shortcuts and mouse actions, functions that computers do not currently have, and combinations of these functions to discrete voice commands. The speech recognition command system 102 may comprise a structured grammar to generate the voice commands. The structured grammar may use a limited vocabulary and may be governed by usage or grammar rules enabling voice command control of a computer platform or object. The structured grammar may facilitate voice command recognition in sub-optimal conditions, such as suboptimal microphones and background noise. The speech recognition command system 102 may make use of existing optimization methods to optimize structured grammar that may be used specifically for computer control, as well as other tasks, such as dictation. The speech recognition command system 102 may incorporate elements of linguistics, cognition, networking, human behavior, and the like. Voice commands based on the structured grammar may be easy to remember and combine, and many computer steps may be carried out in a single voice command, which may speed computing. The speech recognition command system 102 may enable computer control in conjunction with or instead of certain input devices 120. Commands may be confirmed, visualized, seen or otherwise known through at least one output device, such as a computer monitor, a television, a projector, an LCD screen, a touchscreen, a printer, a speech generator, a sound generator, a speaker, and the like. For example, if the command "3 Lines Bold" is issued, the output device, such as a computer monitor, may demonstrate the 3 lines below the cursor being selected and then turning bold. The speech recognition command system 102 may enable one-step file, folder and Web site access, seamless movement among programs, commands that work consistently across programs, and the like.

The speech recognition command system 102 may be operable with many different speech engine platforms 154, such as Nuance's Dragon NaturallySpeaking, the engine contained in Microsoft's Vista operating system, and the like. The speech recognition command system 102 may be used with many different platforms, such as IVR, mobile devices such as handheld computers and cell phones, desktop and laptop computers, smart phones, embedded systems, gaming systems, kiosks, robots, transcription, automotive systems, language learning systems, home automation systems, assistive technologies for the visually impaired and/or disabled, and the like. In working with the system 102 across platforms, the user may acquire a better mental map of commands and rules. The system 102 may work across all programs using the same vocabulary. Once the user may see how the system 102 works on a computer, the user may more easily picture how the same commands work in screenless environments, such as robotic platforms, which may make it easier to use in those environments.

Commands to control an application may be issued by a user and transmitted through an input device 120 of a speech recognition command system 102 to a command processor 110. Commands may be received and interpreted by the command processor 110. In embodiments, interpretation of the commands is facilitated using grammar rules stored on a grammar rules server 108. When a command has been processed by a command processor 110, the required actions associated with the command may be executed by a user interface 104 associated with the application in focus or indicated by the command. Using the grammar rules stored on a grammar rules server 108 and the vocabulary database 118, commands may be created and/or edited for use and storage in a commands database 112.

Figure 4:
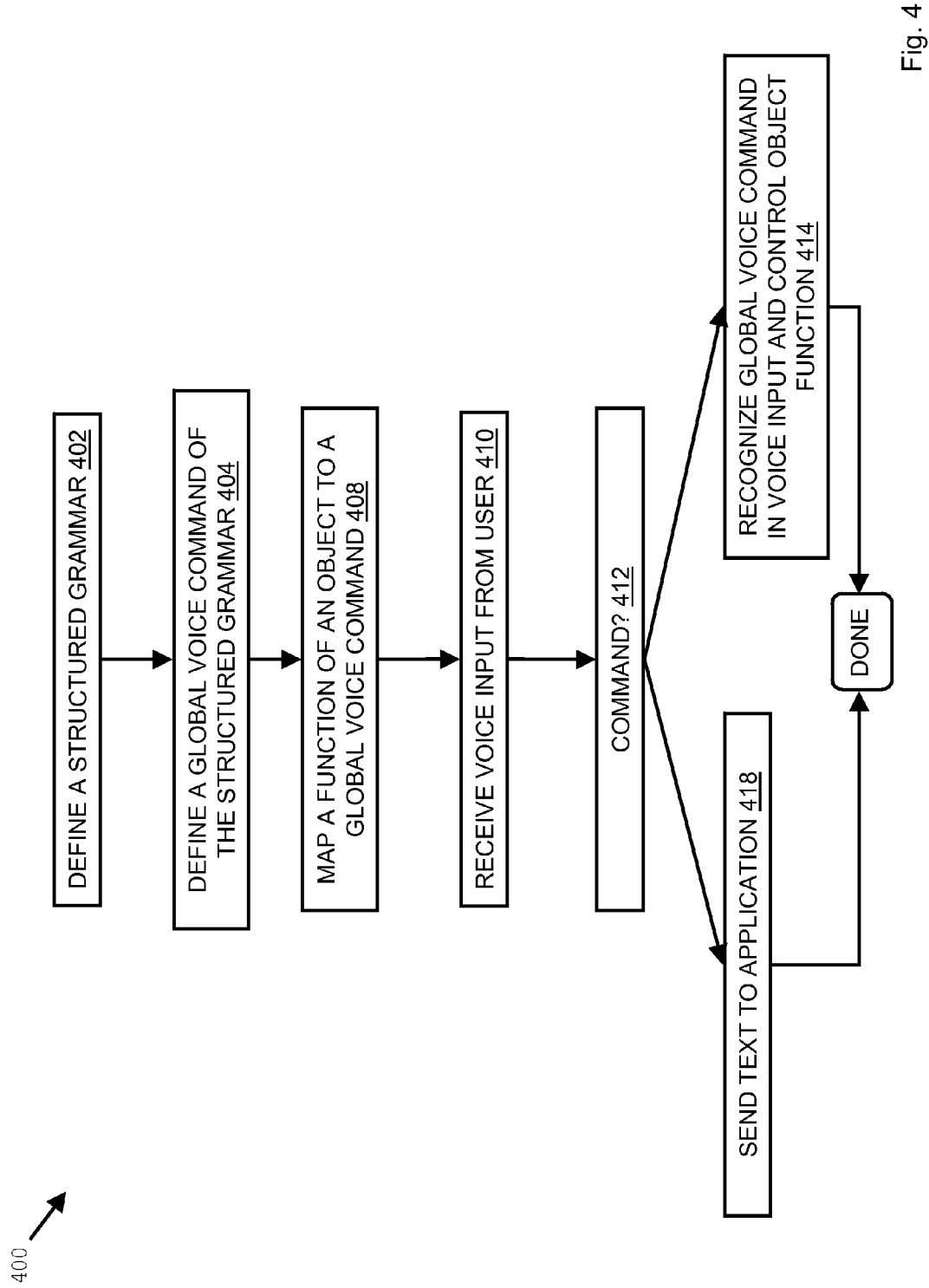
FIG. 4 depicts a process flow for a speech recognition system.

Referring to FIG. 4, a process flow of the speech recognition system is depicted. In an embodiment, a system and method for enabling a user to interact with a computer platform using a voice command may comprise the steps of defining a structured grammar for handling a global voice command 402, defining a global voice command of the structured grammar 404, wherein the global voice command enables access to an object of the computer platform using a single command, and mapping at least one function of the object to the global voice command 408, wherein upon receiving voice input from the user of the computer platform 410, the system determines whether a command has been received 412. If the system determines that a command has been received, such as by comparing the voice input to a set of commands, the object may recognize the global voice command and control or execute the function 414. If the voice input does not contain a voice command, the input may be recognized as a text input and text keystrokes may be sent to the application in focus 418. In an embodiment, the function 414 may be establishing at least two cursor positions with respect to at least one object of a computer platform. In an embodiment, the voice command 404 is adapted to initiate a phrase mode. Upon initiation of the phrase mode, the system handles the words within that phrase based on a keyword of that phrase and automatically terminates the phrase mode at the end of the phrase. In an embodiment, the global voice command enables building a custom list of objects and the function 414 may relate to a listed object. In an embodiment, the global voice command specifies placement of an object with respect to an x-y or x-y-z coordinate system.

In embodiments, the speech recognition command system 102 may comprise an input device 120. In embodiments, the input device 120 may be a keyboard, a mouse, a touch pad, a roll ball, a touch-sensitive device, a gesture recognition system, a device providing remote access to the computer such as a cell phone or other pervasive computing device, and the like. In an embodiment, the input device 120 may be a device that works in conjunction with speech input and that allows the user to control the computer by hand. For example, a speech remote may be easily held in or fixed to a user's hand or clothing, allowing the user to sit back in a chair or walk around while using speech input. The user may also have the option to hit a few controls by hand such as pointing and turning speech input on and/or off using the speech remote. In an embodiment, the input device 120 may be a speech stick. A dedicated speech stick or chip may plug into a computer through a port, such as a USB port. The speech stick may provide speech input to any computer that supports such a port. In an embodiment, the input device 120 may be a portable speech-enabled office. A Portable Office device may allow the user to plug custom input and storage devices into any appropriate computer. An example of a portable office may comprise a speech chip, speech engine software, speech interface software, pod-type sound card and microphone, speech remote, and USB-stick-type storage. In embodiments, the input device 120 may enable a computer to sense that a person's speech is meant for the computer rather than for another purpose, such as another person in the room. For example, a camera may pay attention to where the user may be looking and/or some other motion or placement and may coordinate with the speech recognition command system 102 to stop listening when appropriate, for example, such as when the user is looking away from the computer. This may allow users to more easily work with multiple computers and other people at the same time as controlling a computer using speech recognition.

The grammar rules server 108 may be a repository of human-machine, or structured, grammar and grammar rules. The grammar rules server 108 may be automatically updated. Human-machine grammar may be a system of words and rules designed to allow humans to communicate commands to computers. Human-machine grammar may take into consideration that humans have an extensive natural language capacity that has evolved over millions of years and that is used seemingly without effort, while computers do not yet have the ability to understand the meaning of speech. Human-machine grammar may also take into consideration that while language seems easy for humans, different phrasings encompass a considerable span of cognitive effort. Human-machine grammar may limit cognitive effort in order to free up as much of the brain as possible to concentrate on the task at hand.

Natural language may allow for a wide, textured range of communications, but controlling a computer may only require a relatively small set of distinct commands. Human-machine grammar may comprise a relatively succinct set of words that may be combined according to a concise set of grammar rules to communicate a set of commands. The human-machine grammar rules may be aimed at keeping the speech interface vocabulary small and easy to remember and predict. These guidelines may obviate alternate wordings and establish consistent patterns across the entire set of commands, making it much easier to remember or guess how a command should be worded. Thus, human-machine grammar may be relatively easy for humans to learn, and computers may respond to the commands without having to decode natural language or be loaded down with large sets of synonymous commands. Human-machine grammar and grammar rules may underlie the voice commands stored in a commands database 112

In an embodiment, a grammar rule may comprise matching the words used for a command as closely as possible with what the command does. This may make commands easier to remember. For example, "Line" may refer to a line of text, "Touch" may refer to clicking an on-screen element with the mouse arrow, "File" may refer to a file, "Folder" may refer to a folder, and the like.

In an embodiment, a grammar rule may comprise using words the user may see on the screen. This may also make commands easier to remember. When enabling menu commands, for example, a grammar rule may comprise using the words that already exist, such as the menu labels, to indicate menu actions.

In an embodiment, a grammar rule may comprise consistency. Consistency may make commands easier to remember and guess and may enable automation. Consistency may mean always using the same term to refer to an object or action, and the same constructions to build commands. For example, in the commands "Line Bold", "Line Delete", and "Line Duplicate", the construction of the command is consistent in beginning with the object being acted upon, a line in this example, and following the object with a command to be executed upon the object.

In an embodiment, a grammar rule may comprise balancing the ease of saying a command with the ease of remembering a command. The ease of saying a command may be important, but may become even more important the more often a command may be used. In contrast, the ease of remembering a command may be important, but may become even more important for commands that may not be frequently used. For example, clicking the mouse may be common, and therefore must be easy to say. In this example, "Button Click" may be particularly difficult but "Touch" may be easier and also matches what the command does. In enabling menu commands, it may be important to use the words on the menu labels because even though they might not be worded well for ease of saying, most of them are adequate, there are numerous menu labels, and it may be much easier to remember commands that a user may see on screen.

In an embodiment, a grammar rule may comprise using one-word commands sparingly, and keeping the number of words used in any given command to a minimum. One-word commands may be easy to remember and say, but are more apt than longer commands to be tripped accidentally when a user may mean to say them as text. For a few commands that are used often, such as "Enter," "Backspace," "Space," and "Close,", it may make sense to enable the commands as one word commands. For example, in situations where the system may be limited to commands, such as when the focus is on a dialog box, and when the desired command may be on-screen, one-word commands may be desired. In any event, commands may comprise more than one word. In certain embodiments, the voice commands do not comprise more than two words. Keeping the number of words used in a command to a minimum may make it easier to remember, say and combine commands.

In an embodiment, a grammar rule may comprise eliminating unnecessary words. This grammar rule may be closely related to rules involving one-word commands in that one way to keep commands succinct is to eliminate words that may not be necessary. For example, articles like "a" and "the", and polite, getting-started, and redundant filler words may not be needed. It may not be necessary to include an action word when identifying an object; it may be sufficient to imply that action. For example, identifying a folder, such as "Budget Folder", may be enough to indicate that the folder named "Budget" should be called up by the program in use. It may not be necessary to include the object, the action, or the type of units. For example, the object may be a cursor, the action may be to move the object, and the type of units may be characters, but instead of specifying each parameter of the command, "3 Left" may be sufficient to indicate that the cursor be moved three characters to the left.

In an embodiment, a grammar rule may comprise eliminating synonyms. A vocabulary without synonyms, which may be small, may make commands easier to remember and predict. It may also make combining commands practical, which, in turn, may make using a computer faster and more efficient. For example, the word "This" may refer to something that may be highlighted or on the clipboard 114. It may be the only word that carries these meanings. If a command is desired that does a single action to a selection, such as "This Cut", or "This Bold", a user may know to use this word. In another example, the word "Back" may refer to moving something in the direction to the left of the cursor. In this example, the command, "Word 3 Back" may move the word nearest the cursor 3 words to the left. In another example, the word "Forward" may refer to moving something in the direction to the right of the cursor. In this example, the command "Graph 2 Forward" may move the paragraph nearest the cursor down two paragraphs. Eliminating synonyms may keep the length of commands short and enable different types of functions. For example, if "Back" and "Forward" always refer to moving an object, there may be no need to include wording that indicates moving an object, such as "Move" along with the directional words back and forward. Thus, the word "Move" may be used in another command without confusion.

In an embodiment, a grammar rule may comprise reusing vocabulary words. Enabled by context, the world's languages regularly reuse vocabulary words. It may be advantageous to reuse vocabulary in order to keep the vocabulary small and easy to remember. For example, "Top" may refer to the beginning of a document and the command "Go Top" may put the cursor at the beginning of a document. In this example, "Top" may also refer to the portion of a word, line, paragraph or document that lies before the cursor. For example, "Graph Top", may select the portion of a paragraph that may be before the cursor and "Doc Top" may select from the cursor to the beginning of the document. Numbers may also be used in several different ways. Numbers may refer to hitting a key a number of times, such as "3 Backspace" or selecting a number of objects, such as "3 Lines". The numbers 1 to 100 may also indicate several types of absolute measures. For example, "Volume 50" may adjust a computer's speaker to its middle volume setting.

In an embodiment, a grammar rule may comprise using existing word pairs. This rule may take advantage of the instinctive knowledge that word pairs carry related meanings. This rule may also help make the vocabulary concise and easy to remember. For example, the voice commands "Back" and "Forward" may be a pair, "On" and "Off" may be a pair, and so forth. In an example, the voice commands "Speech On" and "Speech Off" may turn a microphone on and off. In another example, a word pair may be "Before" and "After." The voice command "5 Before" may move the cursor 5 words to the left, while "5 After" may move the cursor 5 words to the right.

In an embodiment, a grammar rule may comprise following the way people naturally adjust language to fit a situation. This rule may make commands easier to learn and remember. If a command may have no existing word match, identifying an appropriate word for a command may be done in a natural way. For example, to select the three words before the cursor, a command may be "3 Befores," and to select three words after the cursor, "3 Afters." Although these constructions might seem somewhat strange at first glance, they may be easy to learn and remember because they follow natural patterns. For example, "Afters" is already in use as a British term for dessert, as in what you have after a meal. In another example, when people talk about hitting the "Page Up" key several times, they talk about hitting several "page ups", thus, using this as the voice command to scroll a document a page up makes sense.

In an embodiment, a grammar rule may comprise using combined commands that may follow the order of events. This rule enables the user to voice several computer steps in a single command. Combining commands may make the user interface 104 more efficient by cutting down on the steps necessary to carry out computer functions. This rule may also enable cutting down on mistakes simply because there are fewer steps. When combining several steps into one command, it may be easier to picture the action and easier to remember the command if the command wording follows the way the command will be carried out. For example, "3 Lines Bold" may select then bold the three lines below the cursor, and "3 Graphs Cut" may select then cut the three paragraphs below the cursor. In contrast, the commands "Bold 3 Lines" and "Cut 3 Graphs" do not follow the order of events. In general, commands may contain one or more of three types of events: placing the cursor, selecting an object, and carrying out an action. In general, moving the cursor may come first, then selecting an object such as text, a program element, a file, a picture, a program, and the like, and then actions such as moving, formatting, copying, deleting, opening, and the like. However, not all commands may contain these three types of steps. Combined commands may contain more than one cycle of steps, and each cycle may include one, two, or all three elements. Non-essential words may be dropped when commands are combined. For example, "3 Words Bold Blue" may combine the following three commands: "3 Words", "This Bold" and "This Blue." It may be possible to carry out multiple actions that do not necessarily have a natural chronological order. For example, the three types of control keys and four types of formatting actions do not have a natural chronological order and so instead may follow prescribed orders. The Control key combinations may appear in commands in this order: Shift, Alternate, Control. For example, a command may be "Shift-Control a," but not "Control-Shift a." In an embodiment, formatting combinations may appear in an order, such as font face, font size, font style, and font color. For example, the voice command "3 Words Arial Bold Blue" combines selecting, which comes first, with three formatting actions.

In an embodiment, a grammar rule may comprise using words that directly address objects that the computer may perceive and/or control in order to initiate a computer-controlled action rather than using words that address a third party, such as the computer. Using words that directly address objects that the computer may perceive and/or control may be simpler and so may require less cognitive effort. Objects that the computer may perceive and/or control may include computer programs, program elements, on-screen elements such as text, symbols and graphics, virtual objects such as items in virtual reality environments, and physical objects. For example, the command "Window Close" directly addresses the on-screen object "current window" and may result in the command initiating an action within the speech recognition command system to close the window. Additionally, the form of this command may also follow the order of events in that a window is selected first, then it is closed. In contrast, the command wording "Close Window" instructs the computer rather than directly addressing the object "current window" and also does not follow the order of events.

Formatting combinations may make commands more consistent and may eliminate alternative wordings. Combined commands may also give the user efficient ways to recover from mistakes, such as the user miscounting or the computer mishearing, rather than becoming mired in a succession of miscues. For example, a user may be attempting to quickly and efficiently change "two" to "to" immediately after having said "two." The command "Left Backspace Return" carries this out in a single command, leaving the cursor where it started. If the user accidentally said "Left 2 Backspace Return," however, instead of "to" the user may be left with "wo" with the cursor to the right of the letters. The user may correct this mistake in one command, however, by saying "Left Backspace t Return."

In an embodiment, a grammar rule may comprise allowing the user to follow the action when necessary. When the mouse is used to carry out an action that involves several separate steps, such as selecting a paragraph, cutting the paragraph, moving the cursor to another location, and then pasting the paragraph, the user may default to following exactly what is happening because each step may have to be initiated. When using speech to carry out an action that involves several separate steps, and especially when using long speech commands, it may be important to make sure that the user is able to follow the action. For example, when a user may select, cut, move and paste text using a single command, the user should be able to see the text highlighted in its original location before it is cut, then highlighted after it is pasted in the new location. This may allow the user to easily follow the action so the user may automatically confirm what is happening rather than having to figure out what occurred after the fact, perform another operation to confirm an action, or simply take on faith that an action was carried out correctly. Following the action may occur simultaneously with command execution or as close to such time as possible. Audio feedback may also be useful. For example, when a user may turn off the microphone, the user may often be turning away from the computer, such that the audio "Speech Off" and "Microphone Off" confirmations allow the user to not have to wait to see the microphone icon change color. In another example, when a user may copy and cut files to the clipboard 114, an audio confirmation may be transmitted so the user may know that his text has been pasted into the correct clipboard file. In another example, when a user may move the mouse using speech, the action may be followed easily because the mouse arrow may wiggle slightly at the end of a command. The wiggle may be subtle enough that it usually doesn't enter the user's awareness unless she may be told about it, but it may be enough to draw her eye to the new mouse location. In another example, when a user may combine closing a window and clicking "yes" or "no" to save a file, the arrow may pause briefly in front of the proper box so the user may see which box the arrow clicks. The arrow may wait twice as long in front of the yes box as the no box.

Figure 6:
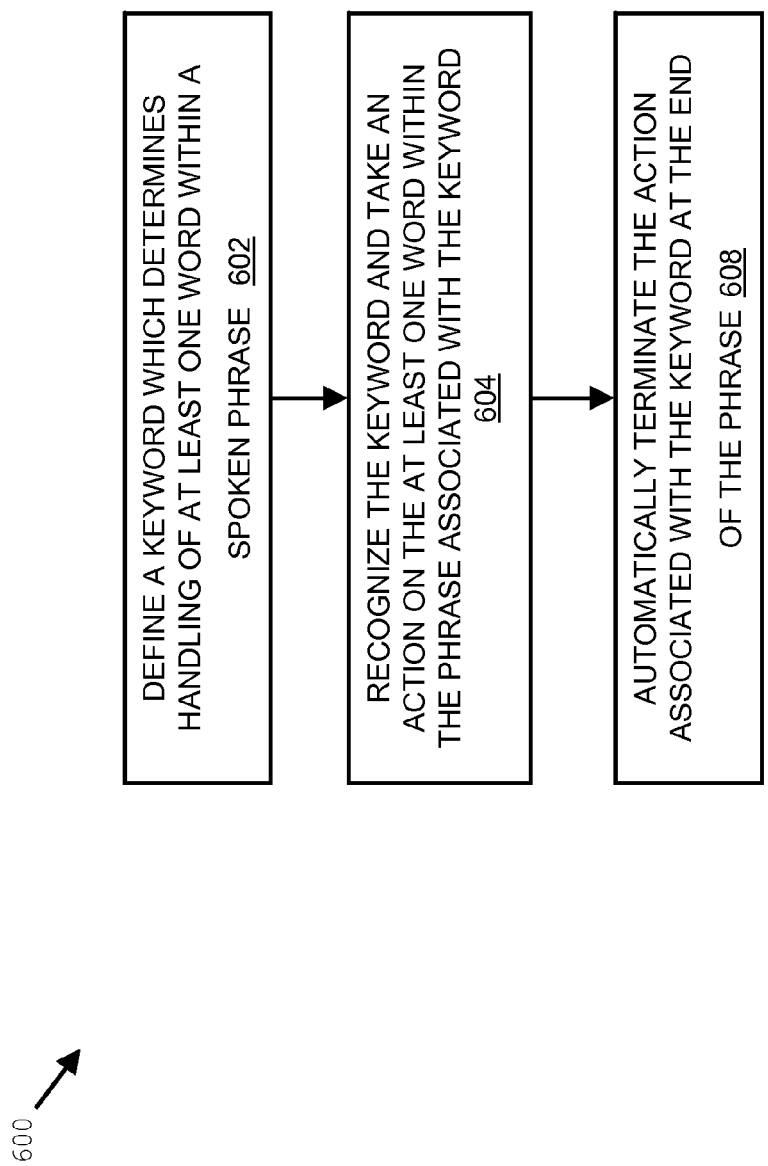
FIG. 6 depicts a process flow for initiating and terminating a phrase mode.

In an embodiment, a grammar rule may comprise using phrase modes, or words that keep mode changes within single commands. In phrase mode, a user may use a keyword within a phrase to modify the meaning of the other words contained within the phrase. The mode may begin with the keyword and end at the end of the phrase automatically, thus enabling a user to change modes within a single step. Phrase modes may also avoid the problem of users losing their bearing with modes that must be turned on and off. In an embodiment of the phrase mode, "Short" and "Long" may be used to distinguish between: several different types of ambiguous spoken commands, such as written and symbolic forms, for example, "3" versus "three" and "star" versus "*"; full forms of words and their abbreviations such as "January" versus "Jan."; words that are homophones, such as "pair" versus "pear"; different formats of the date or time, such as "6-21-05" versus "June 21, 2005"; numbers and number values in otherwise ambiguous combined commands, such as moving the cursor down then typing a number versus moving the cursor down a number of lines; command words and text, such as typing a single word that also appears in the menu bar across the top of many programs; and the like. For example, saying "3" may allow the computer to determine what the user means based on context, but the "3 Short" may type "3", and the "3 Long" may type "three." In another example, saying "Star" may leave the form up to the computer, but "Star Short" may type "*" and "Star Long" may type "star". In another example, saying "Versus" may allow the computer to decide between the long and commonly abbreviated versions of this word, but "Versus Short" may type "vs." and "Versus Long" may type "versus." In another example, saying "3 Down" may move the cursor down three lines, but saying "3 Short Down" may type "3" then move the cursor down one line, and saying "Down 3 Long" may move the cursor down one line, then return "three." In another example, saying "Window" may dropdown the window menu in programs that have one, but saying "Window Long" may type "Window." "Short" and "Long" may be further modified with a number in the case of multiple homophones. These may be arranged according to alphabetical order. For example, saying "4" may leave the form up to the computer, but "4 Short" may type "4," "4 Long" may type "four," "4 Long 1" may type "For," and "4 Long 2" may type "Fore." Similarly, "Pair Long 1" may type "Pair," "Pair Long 2" may type "Pare," and "Pair Long 3" may type "Pear." In this example, "Long 1-10" is not functionally different from "Short 1-10." This method may have the advantage of scalability. As computers get better at distinguishing between forms, users may naturally shift the task of choosing back to the computer by using the default single words more often. In an embodiment, a pause may be required at the beginning of the phrase, at the end of the phrase, or both. Pauses may begin and/or end the current phrase mode. It should be noted, however, that commands may be combined without a pause. Referring now to FIG. 6, a process flow for initiating and terminating a phrase mode is depicted. A system and method of facilitating a phrase mode in a speech recognition system may comprise recognizing a keyword of a spoken phrase in a computer platform, the use of which determines handling of at least one word within the spoken phrase 602, taking an action on the at least one word within the phrase associated with the keyword 604, and automatically terminating the action associated with the keyword at the end of the phrase 608. In an embodiment, the voice command specifies placement of an object with respect to an x-y or x-y-z coordinate system.

In an embodiment, the speech recognition command system 102 may comprise using Time Mode words that allow the user to switch into a mode or state for a certain amount of time. In an embodiment, the system may automatically switch out of the mode when the prescribed time has passed. For example, the command "5 Seconds Break" may allow the user to switch the speech-recognition program from listening state to sleep state for 5 seconds before resuming the listening state. The user may be able to talk freely without interacting with the speech recognition system until the five seconds are up and the speech-recognition program resumes the listening state. In another example, the command "Speech On 5 Seconds" may allow the user to switch from sleep state to listening state for 5 seconds before resuming the sleep state.

In an embodiment, a grammar rule may comprise allowing different ways to invoke the same function, when appropriate. This may be the speech equivalent of a graphical user interface that allows users to go through a menu, click a button on the desktop, or press a keyboard combination to carry out a function depending on the situation. Enabling different ways of carrying out the same function may allow users to take advantage of any existing knowledge they may have about a program. In an embodiment, the speech recognition command system 102 may provide users the option to voice keystrokes to leverage existing knowledge about keyboard commands and to give the user a single way to carry out the same actions via keyboard and voice. For example, the user may have the choice of using a single speech command that invokes a deep menu function, such as "File Save," or a single speech command that carries out a series of keystrokes that accomplishes the same thing, such as "Control S." This may both tap existing knowledge and reduce the chances that a user will be unable to figure out a way to do something by speech even given special circumstances that restrict options. It may also be possible for users to invoke functions using only local knowledge, that is, what they may see on the screen. Dialog boxes present a special case, because on-screen words exist for dialog boxes in two places: on the menu and on the top of the dialog box. Unfortunately, in some programs, some of these labels differ. In these cases, the user may have the choice of calling up the dialog box using a command based on the words used to name the dialog box in the menu system. For example, the first word of a vocabulary database 118 menu label is "Edit", but a command based on the words on the top of the dialog box, for example, may be the first word of the vocabulary database 118 dialog box, or "Vocabulary". This rule enables different ways to carry out the same function rather than the common use of synonymous wordings for the same function.

In an embodiment, a grammar rule may comprise being thorough and consistent in enabling menu commands across all programs. In general, the rule comprises multiple elements, such as: 1) File menu commands may be made up of the first two words of a command as it appears on the menu, ignoring company names, version numbers, and the words "and," and "or."; 2) Menu commands that call up a submenu may also be accessed using the first word of the menu plus the word "Menu"; 3) Menu commands that call up dialog boxes may also be accessed using the first word of the dialog box label plus the word "Box." Note that sometimes the dialog box label does not match the words used to indicate the dialog box on the menu.; 4) Commands such as tabs and text boxes within dialog boxes may be invoked directly using the first word of the dialog box plus the first word of the tab or text box. This type of command may also be combined with standard input to a text box, such as a number, or checking a box. This type of command may be further combined to open the dialog box, provide the input, then close the dialog box by adding the word "Close" to the end of the command. There may be ways to modify certain commands that may still be consistent with this rule, for example: 1) If a top-level menu has just one word, the word "Menu" may be added after the word. For example, "Edit Menu."; 2) If a two-word menu command conflicts with another command in the menu system, the next word of the menu item label may be added, if possible.; 3) If a non-top-level menu command has just one word or is a multi-word command whose conflict with another command cannot be resolved by adding subsequent words, the first word of the menu or menu branch directly before the menu command to the front of the speech command may be added. In the event of continued conflict, a number may be added to the end of the speech command. Commands may be numbered right to left and top to bottom according to their positions in the menu system.; 4) If menu commands do not contain words, they may be numbered in the standard order of left to right and top to bottom. For example, the "Format/Background" submenu in Word may contain just blocks of color. These rules may make it possible for the user to figure out commands by going through existing menus and dialog boxes, gradually saving steps until they become used to the most efficient commands. These rules may work no matter how menu items are constructed, but they may work best when menu items may be generated according to well-established, good interface guidelines that call for consistent, descriptive, noun-based menu items. These rules may work well to fully enable a program's menu system for speech. These rules may allow a user to quickly enable any portion of the menu and dialog box commands for any given program at any given time. Users may be able to change individual wordings in this standard template, but this may be limited to cases in which an often-used command may be especially awkwardly worded. Some program menus or a select few items of a program menu may be enabled to work globally. For example, the speech recognition command system 102 menus may be accessible whether or not the system focus is on the speech recognition command system 102. It is also sometimes useful to enable key functions from certain programs so they can be accessed globally. For example, a screen capture command or sound system controls may be accessed globally. A process may be employed to enable menu commands that may be accessible globally, such as: i) Start the command with the name of the program or, to call up a default program, the name of the type of program, such as Media or Mail, followed by just the first word of the menu item.; ii) If a command conflicts with another command in the menu system, add the next word of the menu item label if possible.; iii) If a conflict with another command cannot be resolved by adding subsequent words, insert the first word of the menu or menu branch that is directly before the menu command after the name of the program (so that it is the second word of the command). In the event of continued conflict, add a number to the end of the speech command. Commands may be numbered right to left and top to bottom according to their positions in the menu system.; and iv) If menu commands do not contain words, number them in the standard order of left to right and top to bottom.

In an embodiment, a grammar rule may comprise classifying any object a computer may perceive and/or control as logical objects, and enabling similar objects to be manipulated in similar ways. Such objects may include computer programs, program elements, on-screen elements such as text, symbols and graphics, virtual objects such as items in virtual reality environments, physical objects, and the like. The basic elements, or objects, of text are characters, words, phrases, lines, sentences, paragraphs and documents. Once these are defined, they may be manipulated, and the cursor may be moved around them, using the same command structures with different object words. In the case of characters, words, phrases, lines, sentences, paragraphs and documents, each text object may be defined in several different ways. For example, "line" may need to be varied depending on if a user may indicate moving the cursor up or down by a line, selecting up or down by a line, and the like. The variations may include: Line Up, Line, Line Ups, and Lines. Similarly, variations for other objects may comprise: Paragraph: Graph Up, Graph, Graph Ups, Graphs; Letter: Left, Right, Lefts, Rights; Word: Word, Before, After, Befores, Afters; and the like. Once these are defined, it may be trivial to apply the command structure to other objects. For example, once a user may know to say "3 Lines" to select the next 3 lines, "3 Graphs", "3 Lefts", and even "3 Lines Delete" may be intuitive. A key to manipulating objects may be identifying the delimiters or whatever defines an object. For example, double punctuation marks, like parentheses and brackets, may define a text object because they define phrases. Text objects delimited by double punctuation marks may play a relatively minor role in prose, but a much more important role in mathematics and programming. Double punctuation marks, along with any other symbolic or label-type delimiters, may be treated in much the same way as any other text object in order to facilitate easy movement among and manipulation of the objects they define. Such objects may also be manipulated as a group using a group name. For example, any object delimited by double punctuation marks may be defined as a "Layer." It may also be useful to specify such an object minus the delimiters. This may be done by adding "Minus 1" to the end of the command. There may be other important objects in specialized text, and their delimiters may include spacing and formatting. For example, screenplays have several important recurring objects: names of characters, shot headers, description, and the like. Because screenplay formatting is standardized, these elements may be treated as objects.

Figure 10:
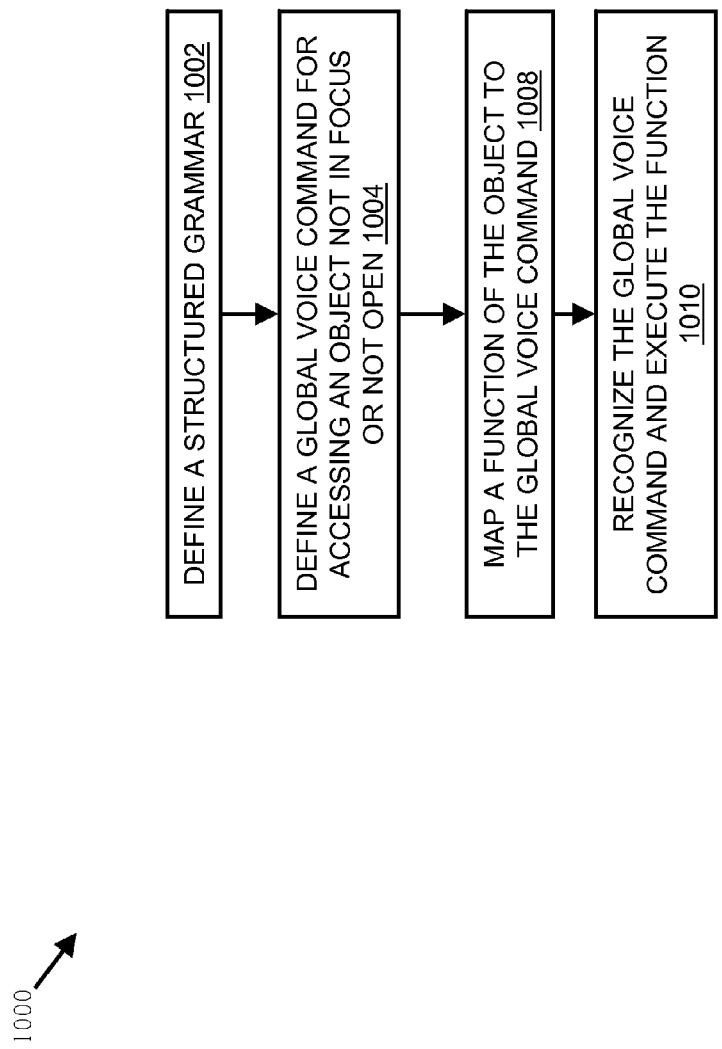
FIG. 10 depicts a process flow for changing the focus of the speech recognition system.

In an embodiment, the speech recognition command system 102 may enable users to specify a computer object within a command. A computer object may be any object a computer may perceive and/or control, including programs, program elements, on-screen elements, screens, virtual objects such as items in virtual reality environments, physical objects, and the like. For example, a command that starts with "Outlook" may switch the focus to the program "Outlook" before continuing to execute the rest of the command. In an embodiment, any computer object may be addressed to put it in focus whether or not it is open. For example, a screen of multiple screens may be addressed to put it in focus. In addition to being able to switch the focus to an object in a single voice command, the voice command may further include instructions for carrying out an action, controlling the object or a function thereof. For example, in a single voice command, a user may address a screen and/or object, then perform an action, such as hitting a keyboard shortcut to access any functionality of the program, or tapping the List functionality, as will be described further herein, to go to a specific folder. This capability makes it so it's not a separate transaction to switch to a program or screen, just as it's not really a separate transaction to turn to a person to speak to them. Since opening any file, folder or website may be made possible via the List functionality, this capability may be combined with addressing an object, such as a program, to open a file, folder or web site in that program, all within a single voice command. In the case of a file or web site, if a program is not specified in the voice command, it may be opened in a default program. In an embodiment, a single voice command may combine addressing a given screen, then addressing a given object, and then carrying out an action on that object. In an embodiment, the capability of switching focus within a voice command allows a user to specify a program and perform an action without having to see the program on a computer screen. Referring now to FIG. 10, a process flow for changing the focus of a speech recognition system is depicted. A system and method for enabling a user to interact with a computer platform using a voice command may comprise the steps of defining a structured grammar for handling a global voice command 1002, defining a global voice command of the structured grammar 1004, wherein the global voice command enables access to at least one object of the computer platform using a single command, and wherein the at least one object is either not currently the focus or not open; and mapping at least one function of the at least one object to the global voice command 1008, wherein upon receiving voice input from the user of the computer platform the object recognizes the global voice command and executes the function 1010.

In an embodiment, the speech recognition command system 102 may enable a user to replace any vocabulary word with any other. The vocabulary database 118 may be accessed by a user, in embodiments through a speech command map facility 142 as described below, to swap vocabulary words, add vocabulary words, delete vocabulary words, and the like. Vocabulary words of any language may be added to the vocabulary database 118. For example, a user may replace any word in the vocabulary across commands, thus the structure of the grammar is preserved while allowing the user to choose vocabulary.

The grammar rules may enable creating and editing speech commands using a vocabulary of words combined according to the grammar rules, as described previously herein. The speech recognition command system 102 may enable commands directed at a variety of tasks and functions, such as and without limitation, dictating, speech menus, and speech help; working with windows; working with program elements including menus, dialog boxes, buttons, icons, and state indicators; working with the mouse arrow; working with files and folders; working at the key level; working with text; working with Email; working with the Web; utilities and productivity tools, and the like. For example, commands may be directed at dictating, speech menus, and speech help, such as: turning the microphone on and off; dictating text; correcting misrecognitions and improving recognition; correcting speech engine platform 154 misrecognitions; forcing commands to be recognized and using the speech engine platform 154 recognition utility; improving recognition by training words and adding vocabulary; accessing the speech recognition command system 102 and the speech engine platform 154 speech menus and help; accessing the speech recognition command system 102 menu items; opening the speech recognition command system 102 documentation to a specific section or subsection; getting around the speech recognition command system 102 help documentation; accessing the speech engine platform 154 menu items; improving recognition more quickly; correcting more quickly; training and adding vocabulary more quickly, and the like. In another example, commands may be directed at working with windows, such as: opening and closing standard programs; opening and closing any program that appears on a start menu or desktop; accessing windows and documents, including from the taskbar and tray; sizing and moving windows; getting ready to move windows, rulers and focus; navigating Windows operating system menus and dialog boxes; manipulating windows; opening a program and recent document in one step; closing and saving a window or document in one step; closing several windows or documents at once; clearing the desktop and calling up a window in one step; sizing two windows at once; switching to a new window and moving the cursor at once; moving the cursor in one window while remaining in another window; turning speech on and changing windows at once; changing windows and putting the microphone to sleep at once; changing windows and turning the microphone off at once; advanced menu commands; clicking on a tray icon and pressing keys; opening the right-click menu and pressing keys; opening the Start menu and pressing keys; opening the Control Panel and pressing keys, and the like. In another example, commands may be directed at working with program elements including menus, dialog boxes, buttons, icons, and state indicators, such as: navigating program menus; navigating dialog boxes; speaking keyboard shortcuts to directly access menu and dialog box items; combining keys and actions; combining keyboard shortcuts with "Close" and "Enter"; combining keyboard shortcuts; typing a number and moving the cursor (speeds dialog box, form, and spreadsheet input); typing a number and moving the cursor several times in a row (greatly speeds dialog box, form, and spreadsheet input), and the like. In another example, commands may be directed at working with the mouse arrow, such as: clicking the mouse arrow; placing and clicking the mouse arrow; placing and clicking the mouse arrow within a single window; moving the mouse arrow up, down, left and right; dragging using the mouse arrow; fine increments and advanced clicking; placing and dragging the mouse arrow in fine increments; clicking multiple times; Control key clicking; moving the mouse arrow and selecting text; moving the mouse arrow and pasting; undoing and moving the mouse arrow, and the like. In another example, commands may be directed at working with files and folders, such as: getting around in Windows Explorer; getting around in file-handling dialog boxes; selecting recently used files from the Start Documents menu; selecting multiple files in a row; selecting files and folders scattered throughout a list in Windows Explorer; calling up files and folders directly using the speech recognition command system 102 lists; calling up files; calling up folders (including drives); quickly adding files and folders, and pasting file and folder paths; quicker ways to add files and folders to file and folder lists; pasting file and folder paths; opening a program and folder at once; and the like. In another example, commands may be directed at working at the key level, such as: hitting command keys; typing just letters; typing capital letters; typing single symbols, numbers and Num Pad keys; typing letters, numbers and/or symbols using the "Spell" command; hitting keys multiple times in a row; hitting command keys multiple times; typing letters, numbers and symbols multiple times; typing double punctuation marks; keyboard shortcuts; holding and releasing "Shift," "Control" or "Alternate"; mixing letters and words; typing long numbers; hitting 2 to 4 cursor/formatting keys and/or symbols (may speed formatting); hitting 2 to 4 cursor/formatting keys and/or symbols several times in a row (may greatly speed formatting); typing a number and moving the cursor (may speed dialog box, form and spreadsheet input); typing a number and moving the cursor several times in a row (greatly speeds dialog box, form and spreadsheet input); hitting 2 to 3 command keys in a row, including multiples (speeds formatting); hitting 2 to 3 command keys in a row, including multiples, several times in a row (may greatly speed formatting); hitting keyboard shortcuts 1 to 10 times in a row; and the like. In another example, commands may be directed at working with text, such as: positioning the cursor relative to a given word, phrase or 1 to 3 characters; positioning the cursor by characters, words, lines, paragraphs, screens, x-y or x-y-z coordinates, and the like; moving the cursor to a given character, word, line, paragraph or screen; making new lines and paragraphs; positioning the cursor at the beginning or end of a word, line, paragraph or document; selecting text; selecting text by specific word, phrase or character; selecting characters, words, lines and paragraphs near the cursor; copying, cutting, pasting, deleting, formatting, capitalizing hyphenating compounding, underscoring, undoing, redoing and duplicating text; undoing and redoing; duplicating words, lines, paragraphs and selections; specifying different forms of words; capitalizing; hyphenating, compounding and underscoring; specifying written, symbolic and abbreviated forms of words; conquering the words "to" and "for"; changing text on-the-fly; making changes on-the-fly at the word level; making changes on-the-fly at the key level; selecting the top or bottom portion of a word, line, paragraph or document; selecting characters, words, lines and paragraphs on both sides of the cursor; selecting a character or word of a given line, or line of a given paragraph; moving the cursor and selecting text; selecting text and cutting, copying, deleting, bolding or italicizing; selecting text and clicking the mouse; moving the cursor by character, line or screen a number of times in a row; moving characters, words, lines and paragraphs; and the like. In another example, commands may directed at working with email programs, such as: opening an email program, checking mail and starting a message; moving the cursor among fields and addressing an email message; checking and sending mail and attaching files to email messages; using the nickname list; starting a new message to regular and cc'd recipients; combining starting a new message and leaving the cursor in different fields; copying text into the body of a new email message; and the like. In another example, commands may be directed at working with the Web, such as: bringing up a Web site; adding Web sites to the website list; navigating Web sites using any browser; selecting text from a Web page using any browser; additional commands for Firefox and Internet Explorer; additional commands for navigating the Web using Firefox, link control and selecting text; speech engine platform 154 commands for navigating the Web using Internet Explorer; specific searches, pasting paths, and going to any printed address; narrowing searches to a specific Web site and/or specific text; pasting the path of a Web site; going to any written Web address, and switching browsers; and the like. In another example, commands may be directed at utilities and productivity tools, such as: finding keywords in any program; copying and pasting among files; copying to a program file, the most recent window, or a window on the taskbar; calling up the speech recognition command system 102 Clipboard 114 files; cutting and pasting directly to and from the speech recognition command system 102 Clipboard 114 files; copying between the system clipboard and the speech recognition command system 102 Clipboard 114 files; adding dates, lists and numbers in any program; adding the date and time in any program; adding day, month and quarter lists; numbering new and existing lines; working with tables and spreadsheets; navigating, selecting and formatting tables and spreadsheets; putting it all together in tables and spreadsheets; timing and breaks; setting the timer; setting the break timer; setting the reminder timer; combining the break timer and timer; controlling sound; controlling the Windows sound system; using the speech recognition command system 102 Help Tools 124 and Notes files; keeping user notes on the speech recognition command system 102 documentation; and the like.

In an embodiment, the speech recognition command system 102 may enable a computer to carry out commands while in sleep mode by adding a single word prefix to that command. For example, the word "Speech" may be added to "Word Open" or "Screen Up" to give "Speech Word Open" and "Speech Screen Up" to switch programs or hit the Page Up key from sleep mode using a single command, rather than having to issue one utterance to wake the microphone up, then say the command, then issue a third utterance to turn the microphone off.

In an embodiment, the speech recognition command system 102 may enable a command that allows speech users to control where the cursor is left at the end of the command, including in its original position. For example, commands may use the words "Return," "Stay," "Close," and the like. In an example, saying "Return" at the end of a command may return the cursor to the position it was in at the start of the command. In an example, saying "Stay" may allow a speech user to indicate that the cursor stay in place when by default it would not have, or to control whether something remains selected during a command.

In an embodiment, the speech recognition command system 102 may enable a command that allows speech users to control which portions of a command are repeated, and how many times those portions are repeated. Words used for this command may be "Times" and "Repeat", where "Times" repeats the last action of a speech command and "Repeat" repeats all the actions contained in a speech command. In an example, "Down Home Hyphen Space Repeat 10" puts hyphens at the beginning of a series of 10 lines.

In an embodiment, the speech recognition command system 102 may enable a command that may allow speech users to differentiate among symbols, homophones and abbreviations. As described herein, the words "long" and "short" plus numbers may be used for this command.

In an embodiment, the speech recognition command system 102 may enable a command that may immediately clear a speech command buffer. For example, the speech command "Wait Wait Wait" may clear the speech command buffer. In an embodiment, the speech recognition command system 102 may enable a command that may control the relative placement of a scroll bar on a computer screen. For example, the speech commands "Scroll 1-100" for the vertical scroll bar and "Across 1-100" for the horizontal scroll bar of the application in focus may be used.

In an embodiment, the speech recognition command system 102 may enable commands that may control the relative placement of a computer-controlled object, such as a robot, in physical space using indicators such as x, y and/or z axis indicators. The orientation of the axes may be predetermined by a setting, determined by the orientation of the object, determined by the orientation of another object including the user, determined by the user on-the-fly, and the like. For example, using x, y, and/or z axis indicators, the speech command "50 By 50" may allow the user to tell the object to go to the middle of the current space, and the speech command "50 By 50 Point 5" may allow the user to tell the object to go to a more precise point near the middle of the current space. The current space may be determined by a preset distance, such as 100 yards on a field, by surface features such as floor tiles, or by barrier, such as the outlines of the current room. This relative placement method may be augmented with relative-to-object speech commands such as "<Object prefix> Here", which may bring the object in question close to the user's location, or <Object prefix> There", which may bring the object in question close to an object the user is pointing to; and mark commands such as "Add Mark 1", which may name and so mark a particular position and "Mark 1" which may place an object at a named position. Any of these relative placement commands may be combined to allow the user to tell the object to carry out series of moves, and may also be combined with other speech commands including commands that indicate actions. Relative placement of objects on a computer screen may be facilitated by use of an on-screen ruler. For example, a user may say "Rulers Open" and rulers may appear along the x- and y-axes of the screen.

Figure 7:
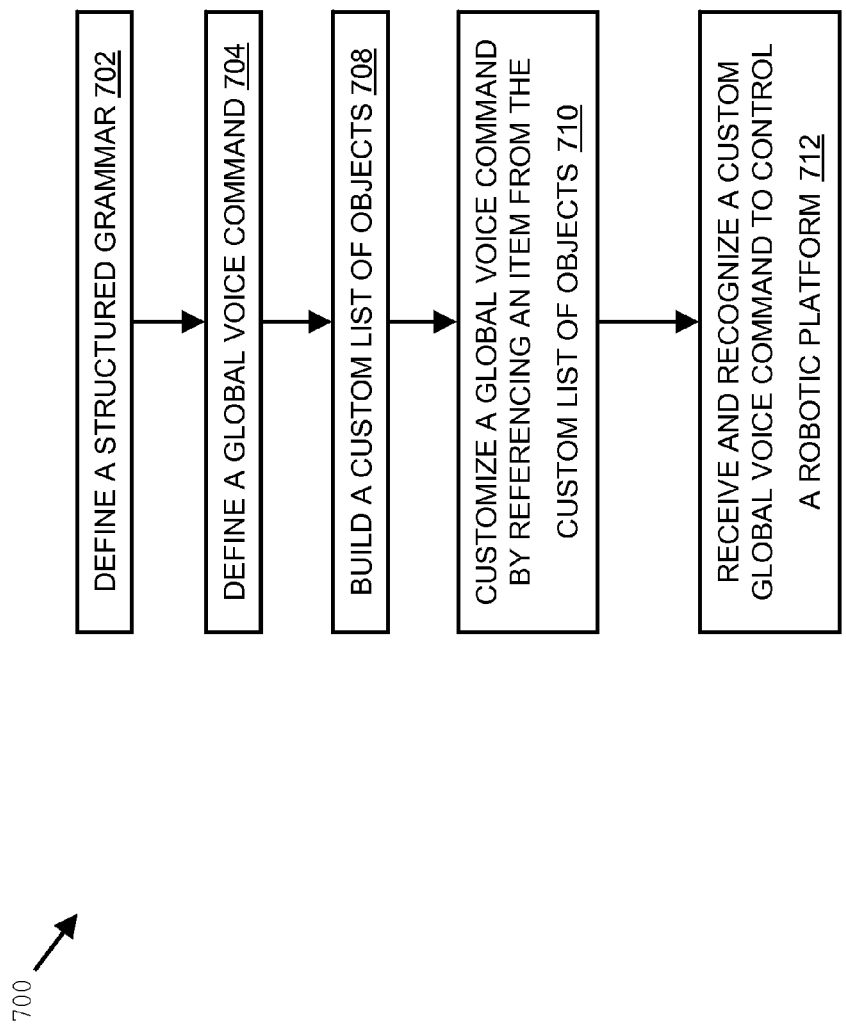
FIG. 7 depicts a process flow for controlling a robotic platform.

The structured grammar may enable robotics control with a speech recognition system. A set of structured commands may comprise a basic command in combination with a List Item. For example and without limitation, the list may be a list of locations, wherein the locations may be kitchen, bathroom, basement, and the like. In this example, the structured command may be Go <Location> (which would cause a robot to proceed to a location), From <Location>, (which would cause a robot to retrieve something from the location), <Time> <Location> (which would cause a robot to go to the location at a certain time). To generate the list of locations, an audio interface of the robot may allow a user to specify and name the present location as a list location. For example, to add the kitchen location a user may say, while they are in the kitchen "Add Location Kitchen". In some embodiments, the robot may confirm by repeating the command "Add Location Kitchen". In an embodiment, the robot may have a visual recognition system that may identify the spatial boundaries of the location. In other embodiments, the user may be able to automatically set the dimensions of a particular location, such as for example, by uttering Add <Location> <Dimension>. In an embodiment, the user may be able to ask the robot for command examples using the list word added, for example, the user may say "Kitchen Examples", and the robot may reply with "Go Kitchen", "From Kitchen", "3 o'clock Kitchen", and the like. Once a location is set, it may be used in all commands that use the location list. Referring now to FIG. 7, a process flow for controlling a robotic platform is depicted. A system and method for enabling a user to interact with a robotic platform using a voice command may comprise the steps of defining a structured grammar 702 for generating a global voice command of a speech recognition system, defining a global voice command based on the structured grammar 704, wherein the global voice command enables building a custom list of objects 708, and customizing a global voice command by referencing an item from the custom list 710; wherein upon receiving voice input from a user, the speech recognition system recognizes the global voice command in the voice input and provides an input to control the robotic platform in accordance with the global voice command 712.

In an embodiment, the speech recognition command system 102 may enable commands that may control the relative placement of a screen that shows a portion, or keyhole, of a larger view, such as a handheld computer interface showing a portion of a Web page or a portion of a camera view. One corner of the small screen, such as the top left corner, may be placed relative to the larger view using indicators such as x, y, and/or z axis indicators. The orientation of the vertical and horizontal axes may be predetermined by a setting or determined on-the-fly depending on the orientation of the small and/or large screens. In an example using x and y axis indicators, the speech command "50 By 50" may allow the user to position the small screen starting with the top corner of the small screen view in the exact middle of the full view. In another example, "50 Point 5 By 50 Point 5" may show a portion of the view with the top corner of the small screen placed more precisely at a point near the middle of the large view. In another example "10 By 10 By 20" may show a portion of the view would be top corner of the small screen placed near the top corner of the larger view and near the bottom of the z axis. In another example, "By 20 By 15" may move the view along the y and z axes only. This relative placement method may be augmented and/or combined with mark commands such as "Add Mark 2", which may name and so mark a particular position and "Mark 2" which may place an object at a named position.

In an embodiment, the speech recognition command system 102 may enable a command that may control the relative placement of the Mouse Arrow and of the Cursor on a computer screen, including multiple insertion points, using vertical and horizontal axis indicators. For example, the speech command "50 By 50" may allow the user to place the mouse in the middle of the screen, the speech command "Cursor 50 By 50" may allow the user to move the cursor separately from the Mouse Arrow, and the command "Mouse 2 10 by 10" may allow the user to place a second type of arrow insertion point near the top left corner of the screen.

In an embodiment, the speech recognition command system 102 may enable a command that may control the relative placement of insertion points like the Mouse Arrow and Cursor across multiple screens. For example, the speech command "50 By 50" may allow the user to place the mouse in the middle of the main screen, the speech command "50 Blue 50" may allow the user to place the mouse in the middle of the screen labeled "Blue" and the command "Cursor 50 Red 50" may allow the user to place the cursor in the middle of the screen labeled "Red".

In an embodiment, the speech recognition command system 102 may enable a command that may methodically name colors using basic color names, basic color name combinations and/or modifying numbers. This may make color names easy to remember, relate and picture.

In an embodiment, the speech recognition command system 102 may enable a command that may use modifiers to allow speech users to directly access organized information. For example, a user may ask for help on a specific program, such as Word Help, a broad aspect of the program, such as Word Help Formatting, or a specific command, such as Word Help indenting. Within these example categories, the user may ask for a simple command list or anything in between, such as Help Indenting Short, Help Indenting Long, Help Indenting Long 1, and the like. In another example, a user may specify a word definition rather than just the word, such as "Photovoltaic Definition", "Photovoltaic Spanish" for a Spanish word, "Photovoltaic Spanish Definition" for a Spanish definition, and the like.

In an embodiment, the speech recognition command system 102 may enable using speech commands that are carried out simultaneously with mouse actions to allow the user to repeat an action at different points on a document. For example, the system 102 may include a Touch List, which may allow the user to keep a list of actions that may be combined with the "Touch" command. For example, "Touch Wait Control L Repeat 5" may click the mouse, wait a second, then hit the keyboard shortcut "Control-L". This single command could be used to make five links anywhere on the page.

Figure 11:
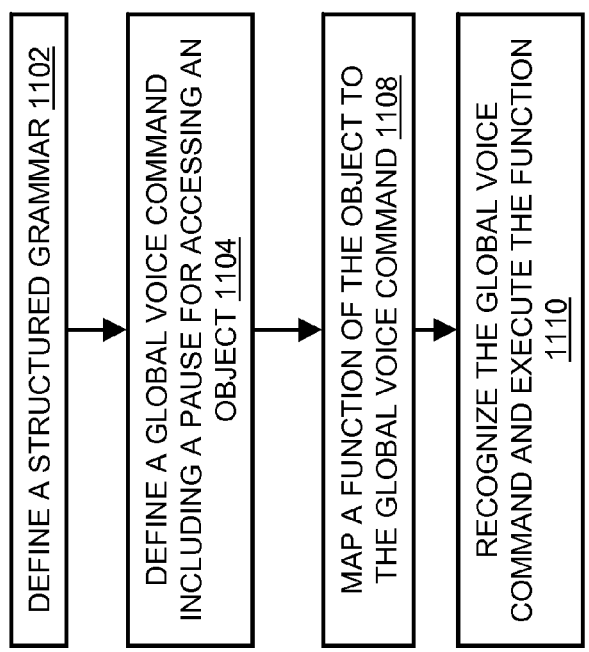
FIG. 11 depicts a process flow for incorporating a wait state in a global voice command.

In an embodiment, the speech recognition command system 102 may enable commands that incorporate a wait state or timed pause. For example, a timed pause may allow the user to move the cursor using any input device during the pause. This may allow the user to affect how the speech command may be carried out, and may be used in conjunction with commands that carry out actions several times in a row. The wait state may enable more complicated commands that take place over time and/or allow for a back-and-forth mix of input methods. Some of these combinations may speed computing time. For example, a user may change a slide every 5 seconds and may specify a 10-slide sequence using a single command. In another example, a user may specify bolding a word 10 times in a row with a 2-second wait between each move, and then use the mouse to move the cursor to a different location every two seconds and bold 10 words anywhere on the screen at once. Referring to FIG. 11, a process flow for incorporating a wait state of a global voice command is depicted. A system and method for enabling a user to interact with a computer platform using a voice command may comprise the steps of defining a structured grammar for handling a global voice command 1102, defining a global voice command of the structured grammar 1104, wherein the global voice command enables inclusion of a pause in accessing an object of the computer platform, and mapping at least one function of the object to the global voice command 1108, wherein upon receiving voice input from the user of the computer platform the function recognizes the global voice command and controls the object 1110.

In embodiments, the speech recognition command system 102 may be operable across different languages.

In an embodiment, the speech recognition command system 102 may enable shortcuts or combinations of shortcuts such as: Windows system keyboard shortcuts; keyboard commands and shortcuts common to menus; keyboard shortcuts common to many programs; keyboard commands and shortcuts common to many dialog boxes, forms and hyperlinked pages (like Word Help); keyboard commands and shortcuts common to tree and file-based views (like Windows Explorer and Open File dialog boxes); e-mail keyboard shortcuts and sequences; Outlook keyboard shortcuts and sequences; Web keyboard shortcuts; Acrobat Reader keyboard shortcuts; Microsoft Word keyboard shortcuts; Microsoft Excel keyboard shortcuts; Microsoft PowerPoint keyboard shortcuts; Gmail keyboard shortcuts; and the like.

Figure 2:
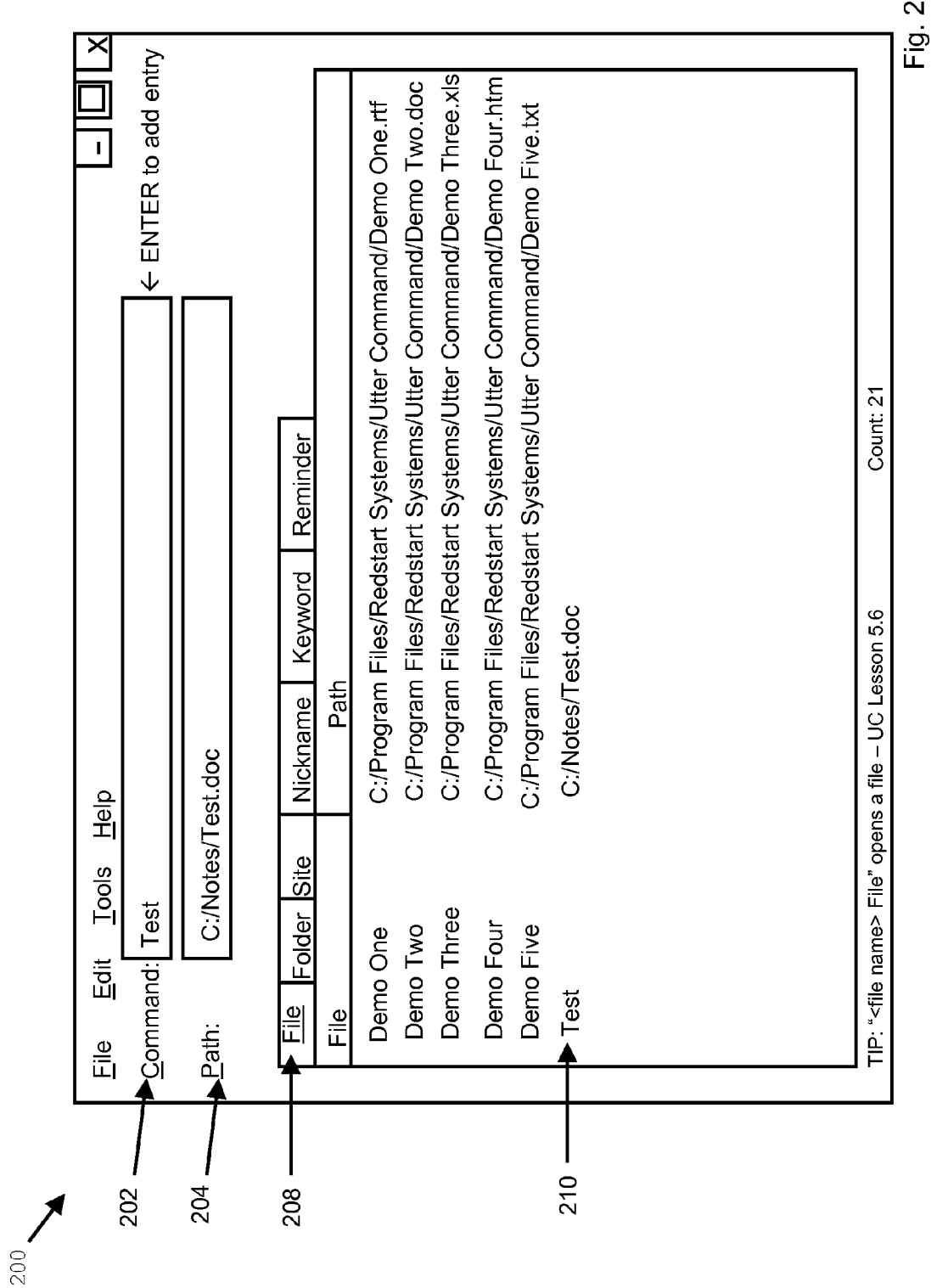
FIG. 2 depicts a File tab of a list commands utility.
Figure 3:
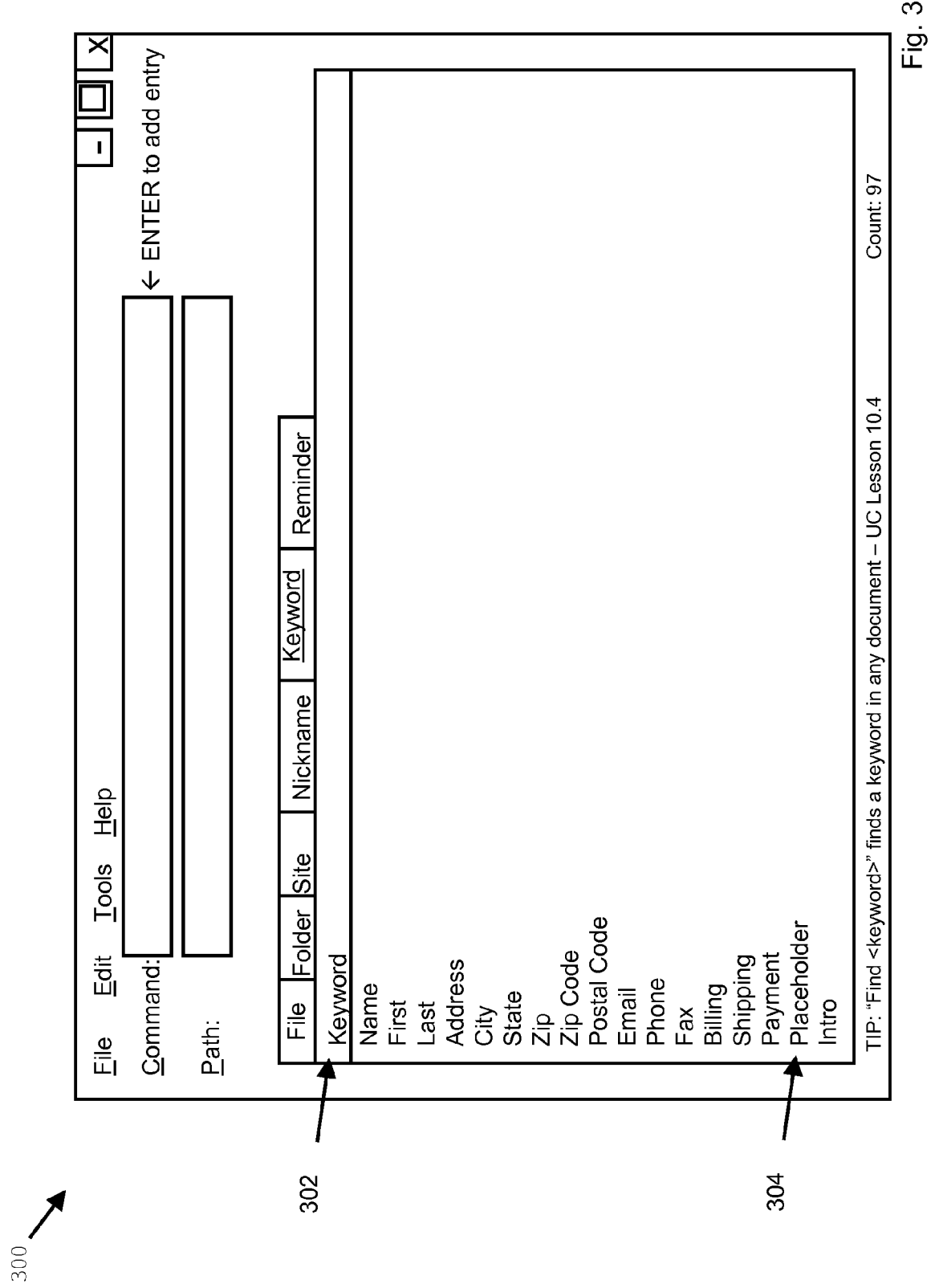
FIG. 3 depicts a Keyword tab of a list commands utility.

In embodiments, the speech recognition command system 102 may enable building and improving the speech recognition command system 102 without programming. In an embodiment, a List Commands utility 158 may allow users to maintain lists of variables used with certain speech commands. While the grammar structure may be predefined, users may define key aspects of the vocabulary. For example, the List Commands utility 158 may allow users to maintain lists of "<word or phrase> Enter" combinations, which may enable going through menus and command-line interfaces, "Touch <character(s), word or phrase>" combinations, which may speed filling out forms, <Code names> Start/Done/Both, which may speed producing computer code such as XML, <amount of time> <word or phrase> combinations, which may enable setting reminders, Find <character(s), word or phrase> combinations, which may enable locating characters or words, <any file> File combinations, which may enable calling up a file, <any folder> Folder combinations, which may enable calling up a Folder, <any Web site> Site combinations, which may enable calling up a Web site, and <email program> <any nickname> combinations, which may enable preparing an email message to a particular contact. Referring now to FIG. 2, a screenshot of the List Commands utility 158 is shown. The List Commands utility 158 is open to the File tab 208. A new entry named "Test" 210 has been added and appears at the bottom of the list. In the utility, the new command being added is shown in the Command 202 field and the file location is indicated in the Path 204 field. The user may now open this file at any time by saying "Test File". Referring now to FIG. 3, a screenshot of the List Commands utility 158 is shown. The List Commands utility 158 is open to the Keyword tab 302. The list of keywords available to the user is depicted in the tab. For example, a user may "Find Placeholder" to find the word "Placeholder" in a document. In another example, a user may say "Name Tab" to move the cursor to the edit field that appears after the word "Name" in a form.

In another embodiment, the speech recognition command system 102 may enable scripting. Scripting may be automatic. Scripting may keep track of user-initiated speech functions, including already combined functions, to identify good candidates for combined functions and allow a non-programmer to build unique combined functions. In another embodiment, the speech recognition command system 102 may collect and analyze user input of any kind to identify objects used in discrete computer tasks such as programming or graphics and the patterns whereby users manipulate those objects in order to automatically build and/or present to the user useful material and strategies that may include objects, rules, commands and command sequences that may be used for efficient speech manipulation.

In embodiments, the speech recognition command system 102 may comprise help tools 124, such as a follow-along list 128, user feedback capture 130, a grammar schematic 132, a dynamic command facility 134, a keystroke facility 138, a menu map facility 140, a speech command map facility 142, a disambiguation facility 144, and the like. In an embodiment, a speech help tool 124 may be a follow-along list 128. The follow-along list 128 may give users a sequence of commands to say and may indicate if the command was carried out successfully and which command the user should say next. The follow-along list 128 may also offer an explanation when something does not go correctly. The explanation may be offered through a dialog box, an error log, an audio format, a printout, and the like. In an embodiment, a speech help tool 124 may comprise user feedback capture 130. User feedback capture 130 may enable collecting efficient speech command sequences from real-world use situations by timing how quickly certain functions are done, then automatically capturing the command sequences that carried out the functions that were done most quickly. This information may be used to improve speech software and may also be used to improve speech use in real-time. In an embodiment, a speech help tool 124 may comprise a grammar schematic 132. The grammar schematic 132 may map a structured grammar and allow the user to see where any given command lies on that map so a user can more easily get his bearings within the structure of the grammar. In an embodiment, a speech help tool 124 may comprise a dynamic command facility 134 that may present the user with a dynamic list of commands she has used. The dynamic command facility 134 may list every command said and allow the user to sort the commands in many ways, such as chronologically, alphabetically, by command subject, and the like. In non-chronological views, identical and similar commands may be collapsed with numbers indicating how many times each command was used. The dynamic command facility 134 may also sort commands by cluster to identify which commands are used in sequence, and common sequences. The dynamic command facility 134 may be used to analyze command use for many purposes, such as development, training, and the like. The dynamic command facility 134 may also be used to build custom macros made from sequences of existing commands. In an embodiment, a speech help tool 124 may comprise a keystroke facility 138 that watches keystrokes and translates the keystrokes to speech commands. The keystroke facility 138 may analyze clusters of keystrokes, since single speech commands may enable performing several keystrokes worth of work. The end result may be a map of speech commands tailored to the user. The keystroke facility 138 may also be used to show the user the most efficient speech commands in a speech or mixed input environment. In an embodiment, a speech help tool 124 may comprise a menu map facility 140 that may map the menus of a given program. The menu map facility 140 may allow a user to quickly scan a program's functions and create a better mental map of the functions. The menu map facility 140 may include speech commands for the various functions, and may allow the user to format, annotate and reorganize the map. In an embodiment, a speech help tool 124 may comprise a speech command map facility 142 that may make a map of a speech command vocabulary that may also indicate use. The speech command map facility 142 may allow users to make macros using the same language so they can more easily share a common language, rather than having users trying to learn different language components for different applications or contexts. The speech command map facility 142 may allow the user to change any given vocabulary word for another vocabulary word, and to build combination commands. In an embodiment, a speech help tool 124 may comprise a disambiguation facility 144. The disambiguation facility 144 may automatically present the user with a command choice box when something the user says is ambiguous. The command choice box may present possible commands that a user may be trying to indicate, including the correct wording to specify to indicate the command. For example, if the user says "To" and the computer can't tell well from context whether the written form should be "2" or "Two" or "To," the disambiguation facility may present a box with the commands "2 Short," "Two Long" and "To Long 1." If the user wants to change the form of the command, the user may say a command that is indicated in the choice box or select a command using another input device 120. The box may go away automatically if the user ignores it and keeps speaking or if the user selects a command with any input device 120. The disambiguation facility 144 may also aid in correcting misrecognitions by the speech engine platform 154. For example, some common misrecognitions may occur between zero and the letter o; a and 8; q and 2; b or p and 3; "Cap a" and "Letter a"; and the like. In some embodiments, the disambiguation facility monitors text for spelling and grammatical errors to aid in identifying misrecognitions.

Figure 8:
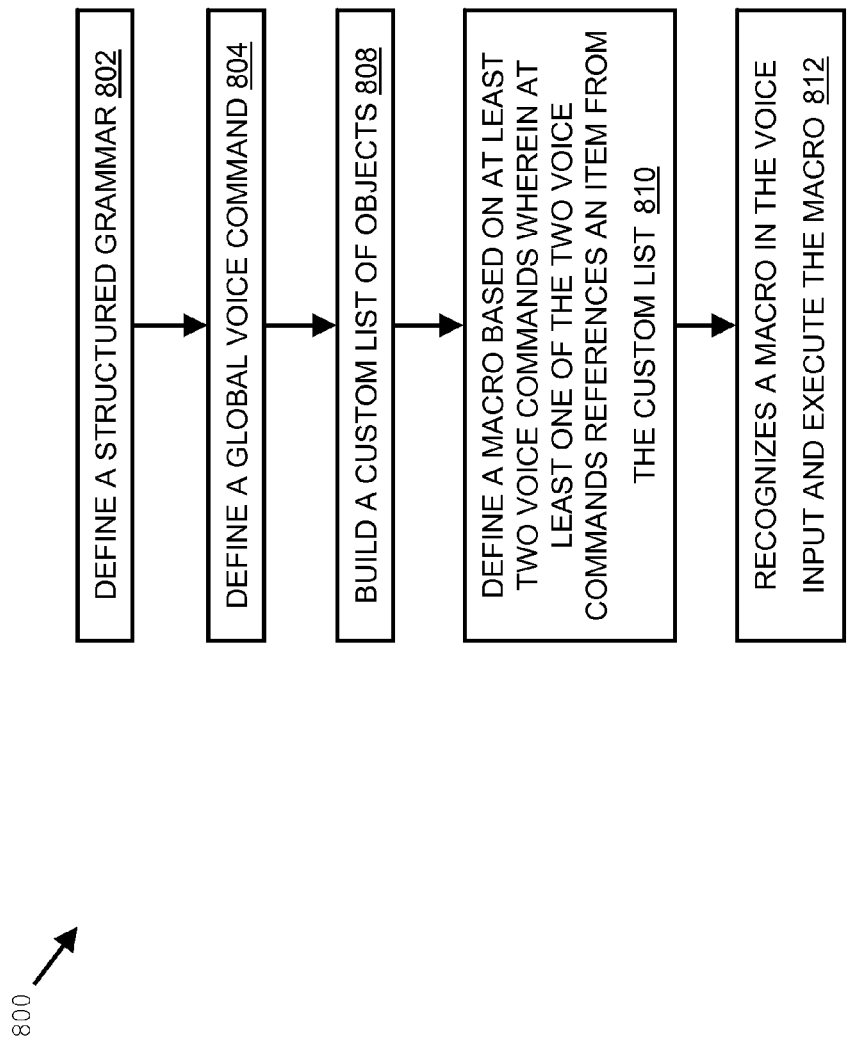
FIG. 8 depicts a process flow for formulating and executing a macroinstruction.

In an embodiment, the structured grammar may enable building custom macros. In an embodiment, a custom macro may be generated by creating a sequence of existing commands or recently uttered commands. For example, a user may call up a history of recently uttered commands, such as with the dynamic command facility 134, and may cut and paste selected entries in the history to generate a custom macro. The structured grammar effectively translates everything that can be done on a computer to voice commands. Further, the list commands allow the user to add words for custom elements that may include folder names, file names, site names, keywords, nicknames, reminders, and the like. These words may be used as building blocks to build more complicated commands. Since the functionality of the computer can be mapped with voice commands generated by a structured grammar, the user may do anything on the computer with combinations of these commands. For example, the dynamic command facility may allow the user to put these building blocks together to form new commands. The facility may allow a user to see the history of a series of commands she's carried out on the computer and simply cut and paste those pieces to form a more complicated command. This may be much easier than programming using programming elements. It also may be much easier than recording a macroinstruction using the keyboard and mouse because recording a macroinstruction is by and large linear, and steps may be hard to describe in elements that are seen. Using the dynamic command facility, the user may, through a series of speech commands, examine and, if necessary, resequence or edit the commands on a list to put together a custom command. This structured-grammar based command-building facility may be used on any type of computing device. Referring to FIG. 8, a process flow for formulating a macroinstruction is depicted. A system and method for enabling a user to interact with a computer platform using a voice command may comprise the steps of defining a structured grammar 802 for generating a global voice command, defining a global voice command of the structured grammar 804, wherein the global voice command enables building a custom list of objects 808, and defining a macroinstruction based on at least two voice commands, wherein at least one of the two voice commands references an item from the custom list 810, wherein upon receiving voice input from the user the platform recognizes a macroinstruction in the voice input and executes the macroinstruction 812.

In an embodiment, the speech recognition command system 102 may comprise a speech control facility 148 that may make it possible to selectively enable and disable speech commands for Windows operating system and program menus and shortcut functions.

In an embodiment, the speech recognition command system 102 may comprise a menu guide 150. The menu guide 150 may automatically speech-enable all menu commands of a given program according to a set of logical rules so users can access every menu command. The menu guide may also allow users to choose which of these menu commands to speech-enable and/or disable. The menu guide 150 may allow users to choose which speech commands should include visual cues that show the user where the command is located in the menu system and/or dialog box and may show if the command has changed a menu or dialog box element.

In an embodiment, the speech recognition command system 102 may comprise a hyperlink facility 152. The hyperlink facility 152 may enable indicating any link on any type of hyperlinked page using numbers, letters and/or symbols. The hyperlink facility 152 may allow the user to put permanent indicators on some links and to arrange the numbers in various ways, such as position on the page, chronological position, and the like.

In an embodiment, the speech recognition command system 102 may comprise a system of modifiers that may allow the user to functionalize a speech link. A speech link may be a link to a resource such as a file or Web page, or specific portion thereof but the link itself may not have to contain the linking code—the speech command may tell the computer how to link. A speech link may be similar to a traditional hypertext link. A speech link may also be indicated by non-electronic text, graphics, and/or objects such as a word on a printed page. Speech links may also contain a modifier to instruct a different kind of link—a link to a dictionary, for example. Because the linking code does not have to be contained within the code for the text or object that is linked, any electronic or nonelectronic text, graphic or object, may be a speech link. For example, a user may apply a dictionary speech link to any word on any electronic or printed page.

In an embodiment, the speech recognition command system 102 may comprise a clipboard 114. The clipboard 114 may be cut and pasted to by speech. The clipboard may contain multiple pages or categories. The clipboard 114 may contain history and search functions. The clipboard 114 may allow the user to go back to anything cut or paste. In an embodiment, historical access to a clipboard may be limited to within a given amount of time. For example, a user may use "plus" or "minus" speech commands to manipulate historical clipboard material. For example, if a user copied and pasted a few times then wanted to go back to the data that were on the clipboard before the last copy, she could say "List 1 minus 1".

Figure 9:
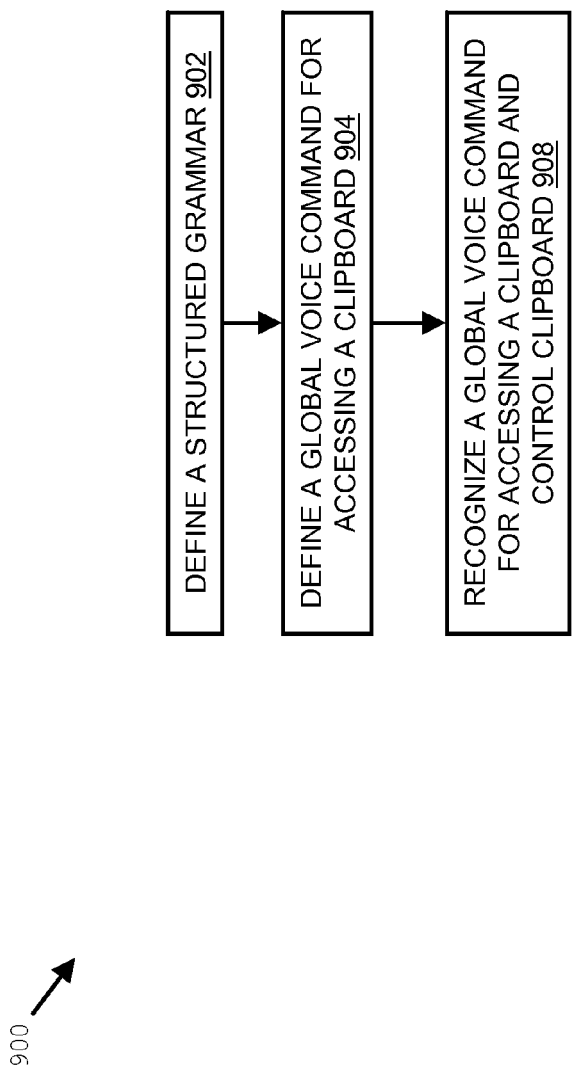
FIG. 9 depicts a process flow for controlling a clipboard using a voice command.

In an embodiment, sorting data may be faster because of the multiple clipboard functionality. For example, each clipboard may be indicated by a different name and a user need only to indicate the name of the clipboard to which they want to paste an item or from which they would like to copy an item. For example, a user may say "Copy to List 1" for one item but use the command "Copy to List 2" for another item. In an embodiment, items, such as URLs, paragraphs of a document, pictures, and the like, may be sorted into separate files using the multiple clipboard functionality using a single voice command instead of cutting and pasting using the keyboard and mouse. Each clipboard file may be accessed, opened, examined, edited, copied, and pasted independently. The clipboard may have a preference associated with it. The preference may be to whether or not data are overwritten or continuously accumulated, what file types may reside in the in the clipboard, and the like. In an embodiment, the clipboard may be permanent, thus, they may persist after the computer is shut down. Referring now to FIG. 9, a process flow for interacting with multiple clipboards of a computer platform using a speech recognition system is depicted. A system and method for enabling a user to interact with a clipboard of a computer platform using a voice command may comprise the steps of defining a structured grammar for handling a global voice command 902, defining a global voice command of the structured grammar 904, wherein the global voice command enables access to at least one clipboard of the computer platform using a single voice command, and wherein upon receiving voice input from the user of the computer platform the platform recognizes the global voice command and controls the clipboard 908.

In an embodiment, the speech recognition command system 102 may enable commands that may allow the user to paste boilerplate text into a document and control the formatting of that boiler plate text on-the-fly using different forms of the command. For example, "Red Sox Roster Lines" may paste the names of the Red Sox baseball team players on separate lines, while "Red Sox Roster Commas" may paste the names separated by commas, and "Red Sox Roster Tabs" may paste the names separated by tabs. This embodiment may include standard boilerplate and a facility that allows the user to change, organize, and or augment the standard boilerplate.

In an embodiment, the speech recognition command system 102 may enable universal functionality across programs. Universal functions may allow software makers to provide tools for commonly-used tasks that work across all applications. For example, a universal find/replace facility, calculator, reference bookshelf tools such as a writer's bookshelf, text sorter, deep clipboard, formatting facility, and the like may be provided by the speech recognition command system 102.

Figure 5:
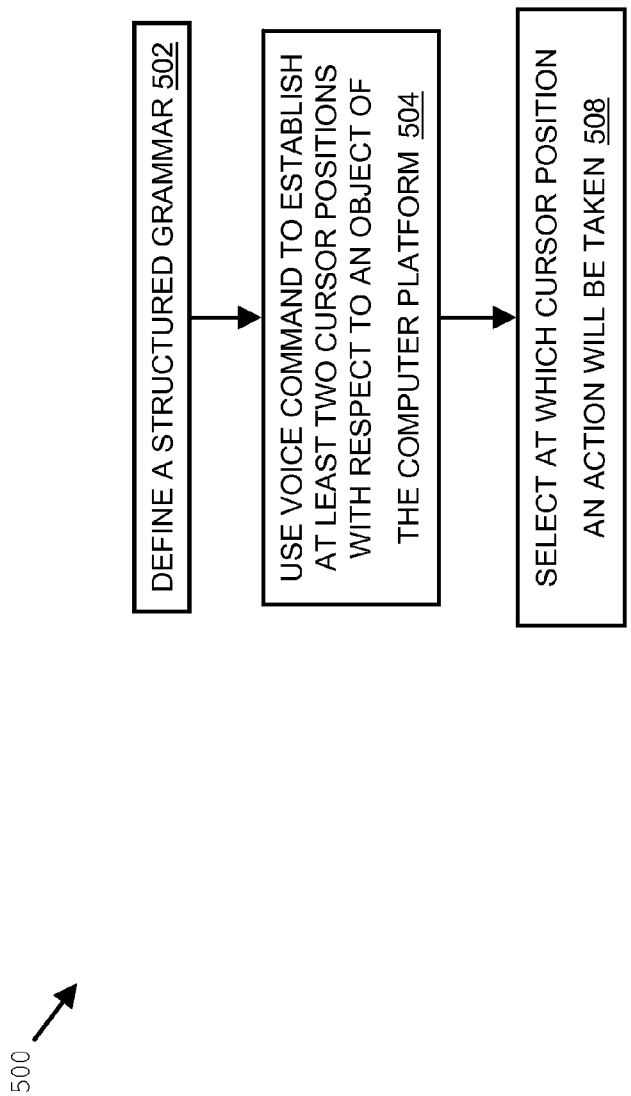
FIG. 5 depicts a process flow for establishing and working with multiple insertion points.

In an embodiment, the speech recognition command system 102 may give the user more control by using multiple cursor/arrow insertion points. Used in conjunction with speech, this may allow the user to, for example, park one insertion point over a button, then use a second insertion point to select text, then go back and address the first insertion point to perform an action on that text. Two or more insertion points may make it possible to do repeated actions quickly and easily. For example, a voice command may be used to establish at least one cursor position. In embodiments, multiple cursor positions may be established. A voice command for establishing the position of a cursor may comprise an x-y or x-y-z coordinate. A voice command may indicate at which cursor position an action will be taken. Referring now to FIG. 5, a process flow for establishing and working with multiple insertion points is depicted. A system and method of using multiple cursors in a speech recognition system may comprise defining a structured grammar 502 for a speech recognition system for a computer platform, the structured grammar adapted to enable a user to use a voice command to establish at least two cursor positions with respect to an object of the computer platform 504, and defining a voice command by which a user may select at which cursor position an action will be taken 508. In an embodiment, the structured grammar 502 facilitates a phrase mode such that handling of words in a phrase is based on a keyword of the phrase. In an embodiment, the object may be drawn from a custom list of objects. In an embodiment, at least one of the at least two cursor positions is indicated by an x-y or x-y-z coordinate.

In an embodiment, the speech recognition command system 102 may reconcile custom speech commands used on multiple computers. For example, the speech recognition command system 102 may change drive numbers on groups of files and folders that appear on a favorites-like speech list.

In an embodiment, the speech recognition command system 102 may be used as a slide assistant. The speech recognition command system 102 may use speech recognition to listen for key phrases under certain conditions to automatically advance slides during a slide show. A user interface 104 may allow users to visually choreograph such timing.

In an embodiment, the speech recognition command system 102 and speech engine platform 154 may be installed, portable, distributed, or the like. The system 102 and platform 154 may be portable to any system by storing the components on a piece of hardware or by using a distributed version of the system 102 and platform 154, such as one hosted on the Internet. For example, the hardware may be a microphone with an embedded memory and/or processor. In this example, connecting the microphone to a computer may prompt a user to install certain components of the system 102 and platform 154 to make the speech recognition command system 102 operable on the computer.

In an embodiment, the speech recognition command system 102 may comprise an audio annotation grammar. The speech recognition command system 102 may give the user a default command vocabulary and ability to add custom vocabulary that may be used to annotate and navigate annotations in the recording using speech commands. The vocabulary may include numbers and existing common waypointing terms, such as Act I Scene 1. For example, the vocabulary may follow the same grammar as desktop speech software, giving the user a good mental map to use this grammar using a no-screen device.

In an embodiment, the speech recognition command system 102 may be used with hidden applications. A hidden application of a user interface 104 may deliberately not give the user any cues in order to prompt the user to figure out what to do. Hidden applications may be used, for example, in teaching, gaming, behavioral research, psychological evaluation, and the like.

In an embodiment, the speech recognition command system 102 may use a speech engine platform 154 to transcribe multi-user speech by transcribing just key words that may be easy to recognize and putting placeholders for the rest that a user may click on to access the corresponding recording. This may speed transcription of audio recordings of multiple voices and low-quality recordings, and may also provide a map so the user may quickly identify key portions of such recordings.

In an embodiment, the speech recognition command system 102 may be implemented on a screenless or small screen environment, such as that of a telephone or a handheld computer. The user may move among and mark queries and results using the same commands used to move among text and playlists. For example, some relevant vocabulary may include: Before, After, Graph, Befores, Afters, Graphs, Mark, 1-100, and the like.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer program product embodied in a non-transitory computer readable medium, the computer program product comprising computer code that when executed on a processor, performs the following steps for enabling a user to interact with a computer platform using a voice command:
   defining a structured grammar for handling a global voice command;
   defining a global voice command for using the structured grammar, wherein the global voice command operates on multiple objects of the computer platform; and
   mapping at least one function of at least one object to the global voice command, wherein upon receiving the global voice command from the user of the computer platform the object recognizes the global voice command and controls the function.

2. The computer program product of claim 1, wherein the structured grammar enables combinatorial voice commands.

3. The computer program product of claim 1 wherein the function involves at least one of a keystroke, a keyboard shortcut, a mouse action, a cursor, and a combination of input functions.

4. The computer program product of claim 1 wherein multiple functions are mapped to a single speech command.

5. The computer program product of claim 1 wherein the voice command controls an input function of a plurality of objects.

6. The computer program product of claim 1, wherein the voice command enables independent control of at least two cursors with respect to at least one object of a computer platform.

7. The computer program product of claim 6, further comprising, specifying a placement of the cursor with respect to an x-y or x-y-z coordinate system associated with the object.

8. The computer program product of claim 6, wherein the at least two cursors are associated with the same object.

9. The computer program product of claim 6, wherein the at least two cursors are associated with different objects.

10. The computer program product of claim 1, wherein the structured grammar enables a phrase mode wherein a keyword of a phrase modifies the meaning of at least one word within that phrase, and upon recognizing the keyword, an action is taken on at least one word within the phrase associated with the keyword.

11. The computer program product of claim 10, wherein the mode is automatically terminated at the end of the phrase.

12. The computer program product of claim 1, wherein the voice command incorporates a wait state.

13. The computer program product of claim 1, wherein the voice command is executed from a sleep state.

14. The computer program product of claim 1, wherein the voice command executes an action for an indicated period of time.

15. A computer program product embodied in a non-transitory computer readable medium, the computer program product comprising computer code that when executed on a processor, performs the following steps for controlling a computer platform via a voice recognition system:

recognizing a global voice command in a computer platform, wherein the global voice command is adapted to control multiple software applications and enable actions possible by keyboard and mouse; and controlling an object in accordance with the global voice command, wherein the global voice command is defined using a structured grammar that facilitates access to objects of the platform using a single voice command.

16. The method of claim 15, wherein the structured grammar enables combinatorial voice commands.

17. The computer program product of claim 15 wherein the function is at least one of a keystroke, a keyboard shortcut, a mouse action, a cursor, and a combination of input functions.

18. The computer program product of claim 15 wherein multiple functions are mapped to a single speech command.

19. The computer program product of claim 15 wherein the voice command controls an input function of a plurality of objects.

20. The computer program product of claim 15, wherein the voice command enables independent control of at least two cursors with respect to at least one object of a computer platform.

21. The computer program product of claim 20, further comprising, specifying a placement of the cursor with respect to an x-y or x-y-z coordinate system associated with the object.

22. The computer program product of claim 20, wherein the at least two cursors are associated with the same object.

23. The computer program product of claim 20, wherein the at least two cursors are associated with different objects.

24. The computer program product of claim 15, wherein the structured grammar enables a phrase mode wherein a keyword of a phrase modifies the meaning of at least one word within that phrase, and upon recognizing the keyword, an action is taken on at least one word within the phrase associated with the keyword.

25. The computer program product of claim 24, wherein the mode is automatically terminated at the end of the phrase.

26. The computer program product of claim 15, wherein the voice command incorporates a wait state.

27. The computer program product of claim 15, wherein the voice command is executed from a sleep state.

28. The computer program product of claim 15, wherein the voice command executes an action for an indicated period of time.

\* \* \* \* \*